(12) United States Patent
Kim et al.

(10) Patent No.: US 11,245,489 B2
(45) Date of Patent: Feb. 8, 2022

(54) METHOD AND APPARATUS FOR BLIND-DECODING PHYSICAL DOWNLINK CONTROL CHANNEL (PDCCH) IN WIRELESS COMMUNICATION SYSTEM

(71) Applicant: Samsung Electronics Co., Ltd., Suwon-si (KR)

(72) Inventors: Taehyoung Kim, Suwon-si (KR); Jinkyu Kang, Suwon-si (KR); Youngbum Kim, Suwon-si (KR); Juho Lee, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 16/724,070

(22) Filed: Dec. 20, 2019

(65) Prior Publication Data
US 2020/0204293 A1   Jun. 25, 2020

(30) Foreign Application Priority Data
Dec. 21, 2018   (KR) .......................... 10-2018-0167250

(51) Int. Cl.
*H04L 1/00* (2006.01)
*H04W 72/04* (2009.01)
(Continued)

(52) U.S. Cl.
CPC .......... *H04L 1/0038* (2013.01); *H04L 5/0055* (2013.01); *H04W 24/10* (2013.01);
(Continued)

(58) Field of Classification Search
CPC .... H04L 1/0038; H04L 5/0055; H04W 24/10; H04W 72/042; H04W 72/0446; H04W 72/14; H04W 80/08
(Continued)

(56) References Cited

U.S. PATENT DOCUMENTS 9,055,577 B2   6/2015   Pan et al.
9,544,881 B2   1/2017   Liu et al.
(Continued)

FOREIGN PATENT DOCUMENTS

KR   10-2019-0014915 A   2/2019

OTHER PUBLICATIONS

3GPP TR 38.803 V14.2.0 (Sep. 2017), Technical Report, 3rd Generation Partnership Project; Technical Specification Group Radio Access Network; Study on new radio access technology: Radio Frequency (RF) and co-existence aspects (Release 14), Sep. 2017, 205 pages.
(Continued)

*Primary Examiner* — Peter G Solinsky

(57) ABSTRACT

A communication technique for convergence of IoT technology and a 5G communication system for supporting a higher data transfer rate beyond a 4G system, and a system therefor. The disclosure can be applied to intelligent services (e.g., smart homes, smart buildings, smart cities, smart or connected cars, health care, digital education, retail business, and services associated with security and safety) based on 5G communication technology and IoT-related technology. According to the disclosure, a method of a terminal of a wireless communication system includes: identifying k' corresponding to a slot offset value based on a time-domain resource allocation table configured for the terminal; receiving, from a base station, a physical downlink control channel (PDCCH) signal for scheduling data transmission in a k-th slot; and blind-decoding the received PDCCH signal in a (k+k')-th slot, wherein k' corresponds to a minimum value among slot offset values configured as the time-domain resource allocation table.

18 Claims, 12 Drawing Sheets

(51) Int. Cl.
*H04W 24/10* (2009.01)
*H04W 80/08* (2009.01)
*H04L 5/00* (2006.01)
*H04W 72/14* (2009.01)

(52) U.S. Cl.
CPC ..... *H04W 72/042* (2013.01); *H04W 72/0446* (2013.01); *H04W 72/14* (2013.01); *H04W 80/08* (2013.01)

(58) Field of Classification Search
USPC .......................................................... 370/329
See application file for complete search history.

(56) References Cited

U.S. PATENT DOCUMENTS

| | | | |
|---|---|---|---|
| 9,549,404 | B2 | 1/2017 | Chen et al. |
| 2019/0044649 | A1 | 2/2019 | Kim et al. |
| 2019/0191360 | A1* | 6/2019 | Sun ......................... H04W 48/12 |
| 2019/0223199 | A1* | 7/2019 | Park ........................ H04L 5/0091 |
| 2020/0008225 | A1* | 1/2020 | Lee ................... H04W 72/1273 |
| 2020/0068599 | A1* | 2/2020 | Yang ..................... H04L 5/0055 |
| 2020/0146028 | A1* | 5/2020 | Yang ..................... H04L 5/0057 |
| 2020/0296697 | A1* | 9/2020 | Hwang ............. H04W 74/0833 |
| 2021/0076327 | A1* | 3/2021 | Li ........................ H04W 52/0235 |
| 2021/0159948 | A1* | 5/2021 | Li ......................... H04B 7/0417 |

OTHER PUBLICATIONS

Qualcomm Incorporated, "Summary for Rel-15 DL/UL data scheduling and HARQ procedure", 3GPP TSG-RAN WG1 Meeting #94bis, Oct. 8-12, 2018, R1-1811891, 13 pages.

InterDigital Inc., "Potential PDCCH enhancements for URLLC", 3GPP TSG RAN WG1 Meeting #95, Nov. 12-16, 2018, R1-1813234, 5 pages.

International Search Report dated Apr. 3, 2020 in connection with International Patent Application No. PCT/KR2019/018292, 3 pages.

Written Opinion of the International Searching Authority dated Apr. 3, 2020 in connection with International Patent Application No. PCT/KR2019/018292, 4 pages.

Supplementary European Search Report dated Dec. 9, 2021, in connection with European Application No. 19900115.7, 12 pages.

Ericsson, "Triggers of NR UE power saving," R1-1813183, 3GPP TSG-RAN WG1 Meeting #95, Spokane, Washington, USA, Nov. 12-16, 2018, 5 pages.

Nokia, "Combined CR of all essential corrections to 38.214 from RAN1#94bis and RAN1#95," R1-1814395, 3GPP TSG-RAN WG1 Meeting #95, Spokane, Washington, USA, Nov. 12-16, 2018, 111 pages.

Qualcomm Incorporated, "Remaining Issues on DL/UL Resource Allocation," R1-1807652, 3GPP TSG-RAN WG1 Meeting #93, Busan, Korea, May 21-25, 2018, 16 pages.

Qualcomm Incorporated, "UE Adaptation to the Traffic and UE Power Consumption Characteristics" R1-1813447, 3GPP TSG-RAN WG1 Meeting #95, Spokane, Washington, USA, Nov. 12-16, 2018, 20 pages.

Samsung, "UE adaptaion schemes," R1-1813011, 3GPP TSG-RAN WG1 Meeting #95, Spokane, Washington, USA, Nov. 12-16, 2018, 11 pages.

ZTE, "Discussion on UE Power Consumption Evaluation Model and Simulation Assumptions," R1-1810336, 3GPP TSG-RAN WG1 Meeting #94, Chengdu, China, Oct. 8-12, 2018, 4 pages.

* cited by examiner

METHOD AND APPARATUS FOR BLIND-DECODING PHYSICAL DOWNLINK CONTROL CHANNEL (PDCCH) IN WIRELESS COMMUNICATION SYSTEM

CROSS-REFERENCE TO RELATED APPLICATION

This application is based on and claims priority under 35 U.S.C. 119 to Korean Patent Application No. 10-2018-0167250, filed on Dec. 21, 2018, in the Korean Intellectual Property Office, the disclosure of which is herein incorporated by reference in its entirety.

BACKGROUND

1. Field

The disclosure relates to a method and apparatus for blind-decoding a physical downlink control channel (PDCCH) in a wireless communication system.

2. Description of Related Art

In order to meet wireless data traffic demands having increased after commercialization of 4G communication systems, efforts to develop an improved 5G communication system or a pre-5G communication system have been made. For this reason, the 5G communication system or the pre-5G communication system is called a "beyond 4G network communication system" or a "post LTE system". In order to achieve a high data transfer rate, the implementation of the 5G communication system in a mmWave band (e.g., 60 GHz band) has been considered. In order to mitigate a propagation path loss and increase a propagation transmission distance in the mmWave band, technologies, such as beamforming, massive multiple-input multiple-output (MIMO), full dimensional MIMO (FD-MIMO), array antenna, analog beamforming, and large-scale antenna, are under discussion for 5G communication systems. Further, in order to improve system networks, technologies, such as an evolved small cell, an advanced small cell, a cloud radio access network (RAN), an ultra-dense network, device-to-device (D2D) communication, a wireless backhaul, a moving network, cooperative communication, coordinated multi-points (CoMP), and received interference cancellation, are under development for 5G communication systems. In addition, advanced coding modulation (ACM) schemes, such as hybrid FSK and QAM modulation (FQAM) and sliding window superposition coding (SWSC), and advanced access technologies, such as filter bank multi carrier (FBMC), non-orthogonal multiple access (NOMA), and sparse code multiple access (SCMA), are under development for 5G communication systems.

The Internet is evolving from a human-centered connectivity network where humans create and consume information into the Internet of Things (IoT) network where distributed elements, such as objects, exchange and process information. The Internet of Everything (IoE), which is implemented by combining IoT technology and big data processing technology through connection with a cloud server or the like, has emerged. In order to implement IoT, technical factors, such as a sensing technique, wired/wireless communication, network infrastructure, service interface technology, and security technology, are required, and thus, research has recently been conducted on technologies, such as a sensor network, machine-to-machine (M2M) communication, and machine-type communication (MTC), for a connection between objects. In an IoT environment, it is possible to provide intelligent Internet technology (IT) services that create a new value for human life by collecting and analyzing data generated from connected objects. Through convergence and combination between existing information technology (IT) and various industries, IoT may be applied to fields, such as smart homes, smart buildings, smart cities, smart cars or connected cars, smart grids, health care, smart appliances, and high-tech medical services.

Accordingly, various attempts have been made to apply 5G communication systems to IoT networks. For example, technologies such as a sensor network, machine-to-machine (M2M) communication, and machine-type communication (MTC) are implemented by techniques such as beamforming, MIMO, and array antennas which are the 5G communication technology. The application of a cloud radio access network (cloud RAN) as the above-described big data processing technology may also be an example of convergence between the 5G technology and the IoT technology.

A 5G wireless communication system allocates time and frequency resources of a physical downlink shared channel (PDSCH) by using downlink control information (DCI) transmitted through a physical downlink control channel (PDCCH). In this configuration, the DCI may support not only self-slot scheduling but also cross-slot scheduling, and a base station may configure a time resource allocation table by using higher-layer signaling in order to allocate time resources. A terminal may indirectly recognize a scheduling time point at which a PDSCH is scheduled by using the currently-received DCI, based on the configured table.

The above information is presented as background information only to assist with an understanding of the disclosure. No determination has been made, and no assertion is made, as to whether any of the above might be applicable as prior art with regard to the disclosure.

SUMMARY

A terminal performs blind-decoding in order to receive DCI transmitted through a PDCCH. The terminal inevitably consumes power in order to perform blind-decoding and symbol buffering according to execution of the blind-decoding. Therefore, there is a need for a method and an apparatus for reducing power consumed by the terminal.

In order to solve the above-mentioned technical problems, in accordance with an aspect of the disclosure, there may be provided a method of a terminal of a wireless communication system, the method including: identifying k' corresponding to a slot offset value based on a time-domain resource allocation table configured for the terminal; receiving, from a base station, a physical downlink control channel (PDCCH) signal for scheduling data transmission in a k-th slot; and blind-decoding the received PDCCH signal in a (k+k')-th slot, wherein k' corresponds to a minimum value among slot offset values configured as the time-domain resource allocation table.

Also, the method may further include receiving another PDCCH signal in the (k+k')-th slot, simultaneously with the blind-decoding. Further, the method may further include: identifying whether downlink control information (DCI) for the terminal has been acquired as a result of the blind-decoding; and when the DCI for the terminal has not been acquired, determining that a sleep mode operation is performed in a remaining time period of the (k+k')-th slot. In addition, the method may further include, when the DCI for the terminal has been acquired, identifying a slot offset value indicated by the DCI.

Also, the method may further include: when the slot offset value indicated by the DCI is identical to k', performing data channel transmission/reception indicated by the DCI; and when the slot offset value indicated by the DCI is greater than k', determining that a sleep mode operation is performed in a remaining time period of the (k+k')-th slot. Further, the method may further include: when the sleep mode operation is determined to be performed, identifying whether there exists a pre-configured or indicated operation of the terminal which is to be performed in the (k+k')-th slot; and when the pre-configured or indicated operation exists, performing the pre-configured or indicated operation without performing the sleep mode operation in the (k+k')-th slot, or when the pre-configured or indicated operation does not exist, performing the sleep mode operation in the (k+k')-th slot.

Also, the pre-configured or indicated operation may include at least one of: data transmission/reception scheduled in a slot other than the k-th slot; data transmission/reception according to a configured grant (CG) configured based on higher-layer signaling; or transmission of reception acknowledgement information for received downlink data. Alternatively, the pre-configured or indicated operation may include at least one of: measurement of a downlink signal of the terminal; or reporting of the measurement.

Also, the method may further include receiving higher-layer signaling including configuration information in the time-domain resource allocation table.

In accordance with another aspect of the disclosure, there may be provided a terminal of a wireless communication system, the terminal including a transceiver, and a controller configured to be connected to the transceiver and control to: identify k' corresponding to a slot offset value based on a time-domain resource allocation table configured for the terminal; receive, from a base station, a physical downlink control channel (PDCCH) signal for scheduling data transmission in a k-th slot; and blind-decode the received PDCCH signal in a (k+k')-th slot, wherein k' corresponds to a minimum value among slot offset values configured as the time-domain resource allocation table.

A sleep period of a terminal may be maximized through a method for blind-decoding a PDCCH proposed by the disclosure, thereby enabling minimization of power consumption of the terminal according to blind-decoding of a PDCCH and buffering of a PDSCH by the terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
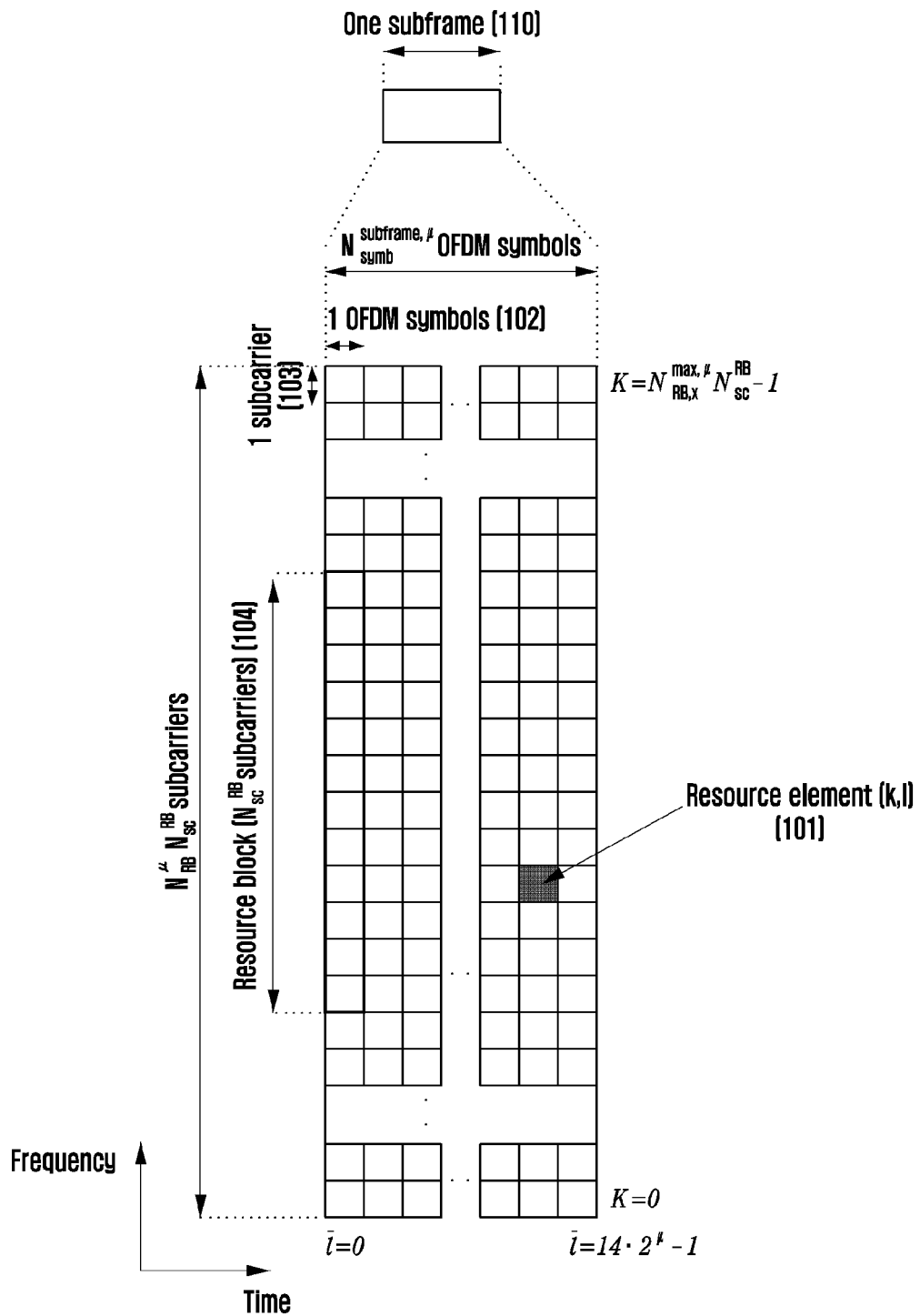
FIG. 1 illustrates a view of a basic structure of a time-frequency domain in a 5G system.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments will be described in detail with reference to the accompanying drawings.

In describing the embodiments in this specification, a description of technical contents, which are well-known in the technical field to which the disclosure pertains and are not directly associated with the disclosure, will be omitted. Such an omission of unnecessary descriptions is intended to prevent obscuring the subject matter of the disclosure and more clearly deliver the subject matter thereof.

For the same reason, some elements are exaggerated, omitted, or schematically illustrated in the accompanying drawings. Further, the size of each element does not entirely reflect its real size. In each drawing, the same or corresponding elements are denoted by the same reference numerals.

The advantages and features of the disclosure and methods of accomplishing the same will be apparent by making reference to the embodiments described in detail below with reference to the accompanying drawings. However, the disclosure is not limited to the embodiments disclosed herein but may be implemented in various different forms. The following embodiments are provided only for completeness of the disclosure and completely informing those skilled in the art of the scope of the disclosure, and the disclosure is defined only by the scope of the appended claims. Throughout the specification, the same or like reference numerals designate the same or like elements.

Here, it can be understood that each block of processing flowcharts and combinations of the flowcharts may be performed by computer program instructions. Since these computer program instructions may be loaded into processors for a general computer, a special-purpose computer, or other programmable data-processing apparatuses, these instructions executed by the processors for the computer or the other programmable data-processing apparatuses generate means for performing functions described in block(s) of the flowcharts. Since these computer program instructions may also be stored in a computer-usable or computer-readable memory of a computer or other programmable data-processing apparatuses in order to implement the functions in a specific scheme, the computer program instructions stored in the computer-usable or computer-readable memory may also produce manufacturing articles including instruction means performing the functions described in block(s) of the flowcharts. Since the computer program instructions may also be loaded into a computer or other programmable data-processing apparatuses, the instructions may cause a series of operation steps to be performed on the computer or other programmable data-processing apparatuses so as to generate processes executable by the computer and enable an operation of the computer or other programmable data-processing apparatuses, and may also provide steps for implementing the functions described in the flowchart block(s).

Also, each block may indicate some of modules, segments, or codes including one or more executable instructions for executing a specific logical function(s). Further, it is to be noted that the functions mentioned in the blocks may occur out of order in some alternative embodiments. For example, two blocks that are consecutively illustrated may be performed substantially concurrently or may sometimes be performed in the reverse order, according to corresponding functions.

Here, the term "~unit" used in the embodiment means software or hardware elements such as a field-programmable gate array (FPGA) and an application-specific integrated circuit (ASIC), and the "~unit" may perform any roles. However, the meaning of "~unit" is not limited to software or hardware. The "~unit" may be configured to reside in a storage medium that may be addressed, and may also be configured to reproduce one or more processors. Accordingly, for example, the "~unit" includes: elements such as software elements, object-oriented software elements, class elements, and task elements; and processors, functions, attributes, procedures, subroutines, segments of program code, drivers, firmware, microcode, circuits, data, databases, data structures, tables, arrays, and variables. The functions provided in the elements and "~units" may be combined with a smaller number of elements and "~units" or may be further separated into additional elements and "~units". In addition, the elements and the "~units" may also be implemented to reproduce one or more CPUs within a device or a security multimedia card. Further, in embodiments, "~unit" may include at least one processor.

Further, in the following description of the disclosure, a detailed description of known functions or configurations incorporated herein will be omitted when the same may make the subject matter of the disclosure rather unclear. The terms which will be described below are defined in consideration of the functions in the disclosure, and may be different according to the intention or practice of users and operators. Therefore, the definitions of the terms should be made based on the contents throughout the specification.

A wireless communication system has been developed from a wireless communication system providing a voice-centered service in the early stage toward broadband wireless communication systems providing high-speed and high-quality packet data services compliant with communication standards, such as: high-speed packet access (HSPA), long-term evolution (LTE) or evolved universal terrestrial radio access (E-UTRA), LTE-advanced (LTE-A), and LTE-Pro of 3GPP; high-rate packet data (HRPD) and ultra-mobile broadband (UMB) of 3GPP2; and 802.16e of the institute of electrical and electronics engineers (IEEE).

As a representative example of the broadband wireless communication systems, an LTE system employs an orthogonal frequency division multiplexing (OFDM) scheme for a downlink (DL), and employs a single carrier (SC)-frequency division multiple access (FDMA) scheme for an uplink. The uplink (UL) refers to a wireless link for transmitting data or a control signal from a terminal (e.g., a user equipment (UE) or a mobile station (MS)) to a base station (BS) (or an evolved node B (eNB)), and the downlink (DL) refers to a wireless link for transmitting data or a control signal from the BS to the terminal. The above-described multiple access schemes generally distinguish between data or pieces of control information of different users by allocating and operating time-frequency resources, on which the data or pieces of control information of the users are to be transmitted, so as not to overlap each other, that is, to establish orthogonality therebetween.

As a post-LTE communication system, a 5G communication system should be able to freely reflect various requirements of users, service providers, and the like, and to this end, should support services which satisfy the various requirements together. Examples of services considered for the 5G communication system include enhanced mobile broadband (eMBB), massive machine-type communication (mMTC), and ultra-reliability low-latency communication (URLLC) services.

The eMBB service is aimed to provide a more enhanced data transfer rate than a data transfer rate supported by existing LTE, LTE-A, or LTE-Pro. For example, the eMBB service in the 5G communication system should be able to provide a peak data rate of 20 gigabits per second (Gbps) for a DL and provide a peak data rate of 10 Gbps for a UL from the viewpoint of a single base station. Further, the 5G communication system should provide not only a peak data rate, but should also provide an increased user-perceived data rate. In order to satisfy these requirements, an improvement in various transmission/reception technologies including a more enhanced multiple-input and multiple-output (MIMO) transmission technology is required. Further, in the current LTE, a signal is transmitted by using a maximum of 20 megahertz (MHz) transmission bandwidth in a 2 gigahertz (GHz) band, whereas in the 5G communication system, the data transfer rate required for the 5G communication system may be satisfied by using a frequency bandwidth wider than 20 MHz in a frequency band of 3 to 6 GHz or over 6 GHz.

Also, the mMTC service in the 5G communication system is considered to support application services, such as Internet of things (IoT). In order to efficiently provide the IoT service, the mMTC service is required to, for example, support massive terminal access within a cell, enhance terminal coverage, increase battery time, and reduce terminal charges. The IoT service provides a communication function by using a variety of sensors attached to various devices, and thus should be able to support a large number of terminals within a cell (e.g., 1,000,000 terminals/km²). Further, since terminals supporting mMTC are highly likely to be located in a shadow zone, such as a basement of a building, which cannot be covered by a cell due to service characteristics, the mMTC service requires a wider coverage compared to other services provided by the 5G communication system. The terminals supporting mMTC need to be low-priced and are not able to have batteries of the terminals frequently replaced, and thus require very long battery life times, such as 10 to 15 years.

Lastly, the URLLC service is a mission-critical cellular-based wireless communication service. For example, services used for remote control of robots or machinery, industrial automation, unmanned aerial vehicles, remote healthcare, and emergency alert may be provided through the URLLC. Therefore, communication provided by URLLC should provide ultra-low latency and ultra-high reliability. For example, the URLLC service should satisfy an air interface latency less than 0.5 millisecond (ms) and, at the same time, should satisfy a packet error rate equal to or less than $10^{-5}$. Therefore, for services supporting the URLLC, the 5G communication system should provide a smaller transmit time interval (TTI) compared to other services and, at the same time, should allocate wide resources in a frequency band in order to ensure the reliability of a communication link.

The above-described three services of the 5G system, that is, eMBB, URLLC, and mMTC, may be multiplexed and transmitted in one system. Here, in order to satisfy different requirements that the respective services have, it is possible to use different transmission/reception techniques and transmission/reception parameters for the respective services.

Hereinafter, a frame structure of the 5G system will be described in more detail with reference to the accompanying drawings.

FIG. 1 illustrates a view of a basic structure of a time-frequency domain which is a radio resource region in which a data channel or a control channel is transmitted in the 5G system.

Referring to FIG. 1, a horizontal axis represents a time domain, and a vertical axis represents a frequency domain. In the time-frequency domain, a basic unit of resources is a resource element (RE) 101, and may be defined by one orthogonal frequency division multiplexing (OFDM) symbol 102 on the time axis, and one subcarrier 103 on the frequency axis. In the frequency domain, $N_{SC}^{RB}$ (e.g., 12) consecutive REs may constitute one resource block (RB) 104.

Figure 2:
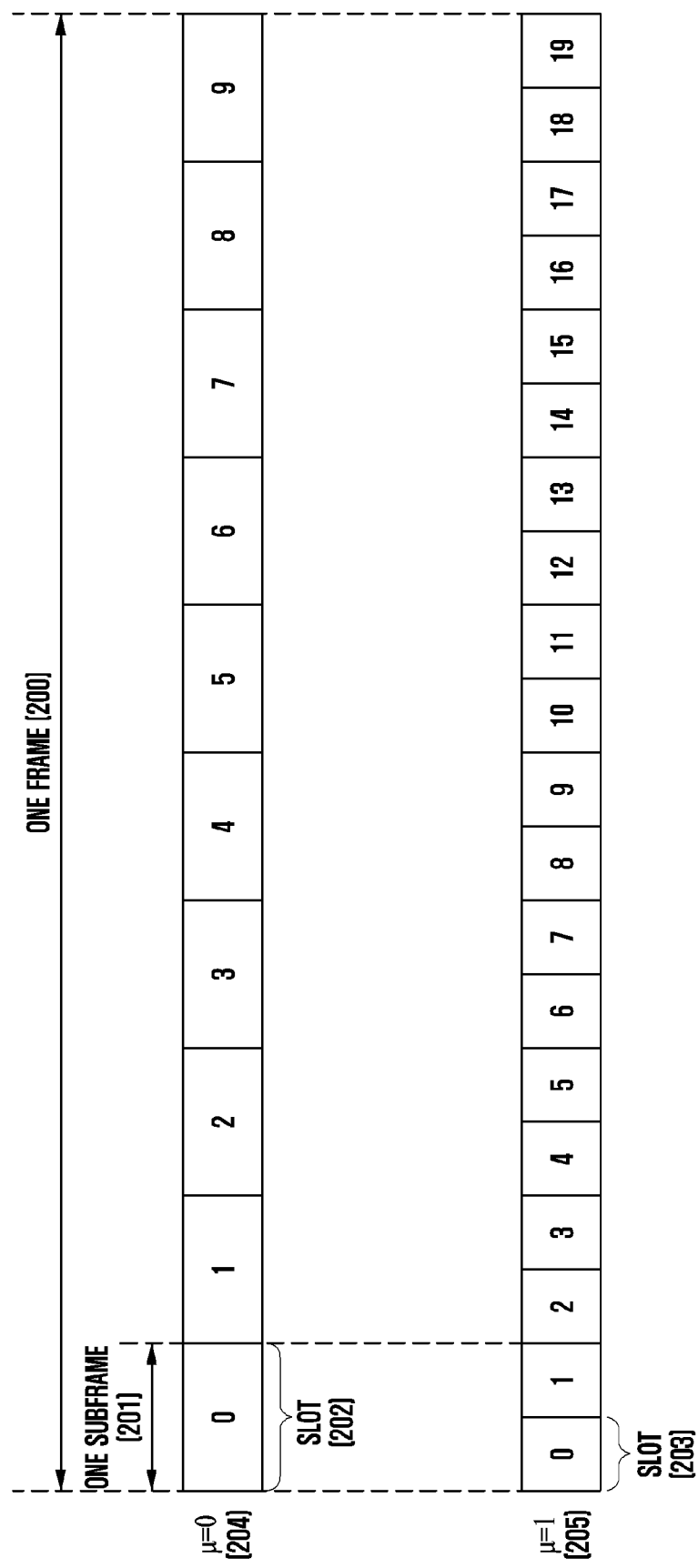
FIG. 2 illustrates a view of a structure of a frame, a subframe, and a slot in a 5G system.

FIG. 2 illustrates a view of a slot structure considered in the 5G system.

FIG. 2 illustrates an example of a structure of a frame 200, a subframe 201, and a slot 202. One frame 200 may be defined as 10 ms. One subframe 201 may be defined as 1 ms. Accordingly, one frame 200 may include a total of 10 subframes 201. One slot 202 or 203 may be defined by 14 OFDM symbols (i.e., the number of symbols per slot ($N_{symb}^{slot}$)=14). One subframe 201 may include one or more slots 202 or 203, and the number of slots 202 or 203 per subframe 201 may depend on a value μ204 or 205 which is set as a subcarrier spacing. In the example of FIG. 2, subcarrier spacing setting values are illustrated for a case of μ=0 204 and a case of μ=1 205. For μ=0 204, the subframe 201 may include one slot 202. For μ=1 205, the subframe 201 may include two slots 203. That is, the number of slots per subframe ($N_{slot}^{subframe,\mu}$) may change depending on the subcarrier spacing setting value p, and accordingly, the number of slots per frame ($N_{slot}^{frame,\mu}$) may change. $N_{slot}^{subframe,\mu}$ and $N_{slot}^{frame,\mu}$ depending on subcarrier spacing setting values μ's may be defined by Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Figure 3:
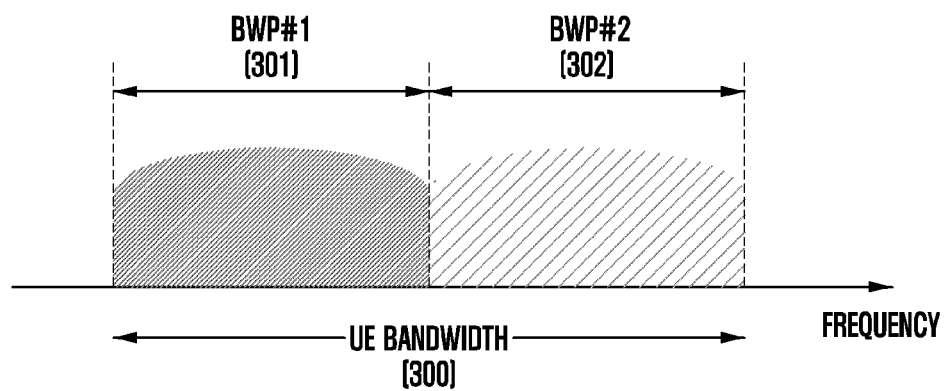
FIG. 3 illustrates a view of an example of configuration of a bandwidth part in a 5G system.

FIG. 3 illustrates a view of an example of configuration of a bandwidth part in a 5G communication system.

FIG. 3 illustrates an example in which a UE bandwidth 300 is configured as two bandwidth parts (BWPs), that is, a BWP #1 301 and a BWP #2 302. A base station may configure one or more BWPs for a terminal, and may configure the following pieces of information for each BWP.

TABLE 2

| | |
|---|---|
| BWP ::= | SEQUENCE { |
|     bwp-Id | BWP-Id, |
|     (BWP identifier) | |
|     locationAndBandwidth | INTEGER (1..65536), |
|     (BWP location) | |
|     subcarrierSpacing | ENUMERATED {n0, n1, n2, n3, n4, n5}, |
|     (subcarrier spacing) | |
|     cyclicPrefix | ENUMERATED { extended } |
|     (cyclic prefix) | |
| } | |

In addition to the above-described pieces of configuration information, various parameters related to a BWP may be configured for the terminal. The base station may deliver the above-described pieces of information to the terminal through higher-layer signaling, for example, radio resource control (RRC) signaling. At least one BWP among the configured one or more BWPs may be activated. Whether to activate the configured BWP may be semi-statically delivered from the base station to the terminal through RRC signaling, or may be dynamically delivered from the base station to the terminal through downlink control information (DCI).

The terminal before being RRC-connected may receive an initial BWP for initial access, the initial BWP being configured by the base station through a master information block (MIB). More specifically, in an initial access stage, the terminal may receive, through a MIB, configuration information on a search space and a control resource set (CORESET) in which a PDCCH for reception of system information (which may correspond to remaining system information (RMSI) or system information block 1 (SIB1)) necessary for initial access can be transmitted. Each of the CORESET and the search space configured through the MIB may correspond to Identity (ID) 0. Through the MIB, the base station may notify the terminal of configuration information, such as frequency allocation information, time allocation information, and numerology, on CORESET #0. Further, through the MIB, the base station may notify the terminal of configuration information on a monitoring cycle for CORESET #0 and a monitoring occasion therefor, that is, configuration information on search space #0. The terminal may regard a frequency domain, which has been acquired from the MIB and is configured as CORESET #0, as an initial BWP for initial access. In this example, an ID of the initial BWP may be regarded as 0.

A BWP configuration supported by the 5G system may be used for various purposes. As an example, when a bandwidth supported by the terminal is less than a system bandwidth, support for this case may be provided through the BWP configuration. For example, a frequency location (locationAndBandwidth) of a BWP in Table 2 may be configured for the terminal, and thus the terminal may transmit or receive data at a particular frequency location in the system bandwidth.

As another example, in order to support different numerologies, the base station may configure multiple BWPs for the terminal. For example, in order to provide any terminal with support for data transmission/reception using both a subcarrier spacing of 15 kHz and a subcarrier spacing of 30 kHz, the base station may configure a subcarrier spacing of 15 kHz and a subcarrier spacing of 30 kHz for two BWPs, respectively. The different BWPs may be frequency-division-multiplexed (FDMed), and when it is desired to transmit or receive data with a particular subcarrier spacing, the BWP, for which the relevant subcarrier spacing is configured, may be activated.

As still another example, in order to reduce power consumed by the terminal, the base station may configure, for the terminal, BWPs having bandwidths of different sizes. For example, when the terminal supports a very wide bandwidth, for example, a bandwidth of 100 MHz, and always transmits or receives data in the relevant bandwidth, very high power consumption may be caused. In particular, it is very inefficient from the aspect of power consumption to unnecessarily monitor a PDCCH in a wide bandwidth of 100 MHz in a state in which there is no traffic. In order to reduce power consumed by the terminal, the base station may configure, for the terminal, a BWP having a relatively narrow bandwidth, for example, a BWP of 20 MHz. The terminal may perform a monitoring operation in the BWP of 20 MHz in a state in which there is no traffic, and when data is generated, may transmit or receive data in the BWP of 100 MHz according to a command from the base station.

In the above-described method for configuring a BWP, terminals before being RRC-connected may receive configuration information on an initial BWP through a MIB at an initial access stage. More specifically, the terminal may receive, from a MIB transmitted on a physical broadcast channel (PBCH), a configuration for a CORESET for a PDCCH through which DCI for scheduling a system information block (SIB) can be transmitted. A bandwidth of the CORESET configured through the MIB may be regarded as an initial BWP, and the terminal may receive a SIB transmitted through a physical downlink shared channel (PDSCH) in the configured initial BWP. The initial BWP may be used to receive a SIB, and may also be utilized for other system information (OSI), paging, and random access.

Next, DCI in the 5G system will be described in detail.

In the 5G system, scheduling information of uplink data (or a physical uplink shared channel (PUSCH)) or downlink data (or a PDSCH) is delivered from a base station to a terminal through DCI. The terminal may monitor a fallback DCI format and a non-fallback DCI format for a PUSCH or a PDSCH. A fallback DCI format may include a fixed field predefined between the base station and the terminal, and a non-fallback DCI format may include a configurable field.

The DCI may pass through a channel coding and modulation process and may then be transmitted through a PDCCH. A cyclic redundancy check (CRC) is attached to a payload of a DCI message, and the CRC is scrambled by a radio network temporary identifier (RNTI) corresponding to an identity of the terminal. Different RNTIs are used depending on the purpose of the DCI message (e.g., UE-specific data transmission, power control command, or random access response). That is, the RNTI is not explicitly transmitted but is transmitted in a state of being included in a CRC calculation process. Upon receiving a DCI message transmitted through the PDCCH, the terminal checks a CRC by using the allocated RNTI. If the check result of the CRC is correct, the terminal may recognize that the relevant message is transmitted to the terminal. Hereinafter, PDCCH transmission/reception can be understood as transmission/reception of DCI through a PDCCH.

For example, DCI for scheduling a PDSCH for system information (SI) may be scrambled by a system information RNTI (SI-RNTI). DCI for scheduling a PDSCH for a random access response (RAR) message may be scrambled by a random access RNTI (RA-RNTI). DCI for scheduling a PDSCH for a paging message may be scrambled by a paging RNTI (P-RNTI). In addition, DCI for notifying of a slot format indicator (SFI) may be scrambled by a slot format indicator RNTI (SFI-RNTI). DCI for notifying of transmit power control (TPC) may be scrambled by a transmit power control RNTI (TPC-RNTI). DCI for scheduling a UE-specific PDSCH or PUSCH may be scrambled by a cell RNTI (C-RNTI).

A DCI format 0_0 may be used as fallback DCI for scheduling a PUSCH, and a CRC may be scrambled by a C-RNTI in this example. The DCI format 0_0, the CRC of which is scrambled by the C-RNTI, may include, for example, the following pieces of information.

TABLE 3

- Identifier for DCI formats (DCI format identifier) - [1] bit
- Frequency domain resource assignment - $[\lceil \log_2 (N_{RB}^{UL,BWP} (N_{RB}^{UL,BWP} + 1)/2)\rceil]$ bits
- Time domain resource assignment - 4 bits
- Frequency hopping flag - 1 bit.
- Modulation and coding scheme - 5 bits
- New data indicator - 1 bit
- Redundancy version - 2 bits
- HARQ process number - 4 bits
- Transmit power control (TPC) command for scheduled PUSCH - [2] bits
- UL/supplementary UL (SUL) indicator - 0 or 1 bit A DCI format 0_1 may be used as non-fallback DCI for scheduling a PUSCH, and a CRC may be scrambled by a C-RNTI in this example. The DCI format 0_1, the CRC of which is scrambled by the C-RNTI, may include, for example, the following pieces of information.

TABLE 4

- Carrier indicator - 0 or 3 bits
- UL/SUL indicator - 0 or 1 bit
- Identifier for DCI formats - [1] bits
- Bandwidth part (BWP) indicator - 0, 1 or 2 bits
- Frequency domain resource assignment
  ○ For resource allocation type 0, $\lceil N_{RB}^{UL,BWP}/P \rceil$ bits
  ○ For resource allocation type 1, $\lceil \log_2 (N_{RB}^{UL,BWP} (N_{RB}^{UL,BWP} + 1)/2)\rceil$ bits
- Time domain resource assignment - 1, 2, 3, or 4 bits
- Virtual resource block (VRB)-to-physical resource block (PRE) mapping - 0 or 1 bit, only for resource allocation type 1.
  ○ 0 bit if only resource allocation type 0 is configured;
  ○ 1 bit otherwise.
- Frequency hopping flag - 0 or 1 bit, only for resource allocation type 1,
  ○ 0 bit if only resource allocation type 0 is configured;
  ○ 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits
  ○ 1 bit for semi-static HARQ-ACK codebook;
  ○ 2 bits for dynamic HARQ-ACK codebook with single HARQ-ACK codebook (when dynamic HARQ-ACK codebook is used together with single HARQ-ACK codebook).
- 2nd downlink assignment index - 0 or 2 bits
  ○ 2 bits for dynamic HARQ-ACK codebook with two HARQ-ACK sub-codebooks (when dynamic HARQ-ACK codebook is used together with two HARQ-ACK sub-codebooks);
  ○ 0 bit otherwise.
- TPC command for scheduled PUSCH - 2 bits
- Sounding reference signal (SRS) resource indicator - $\lceil \log_2 (\Sigma_{k=1}^{Lmax} \binom{N_{SRS}}{k})\rceil$ or $\lceil \log_2 (N_{SRS}) \rceil$ bits
  ○ $\lceil \log_2 (\Sigma_{k=1}^{Lmax} \binom{N_{SRS}}{k})\rceil$ bits for non-codebook based PUSCH transmission (when PUSCH transmission is not based on codebook);
  ○ $\lceil \log_2 (N_{SRS}) \rceil$ bits for codebook based PUSCH transmission (when PUSCH transmission is based on codebook).
- Precoding information and number of layers - up to 6 bits
- Antenna ports - up to 5 bits
- SRS request - 2 bits
- Channel state information (CSI) request - 0, 1, 2, 3, 4, 5, or 6 bits
- Code block group (CBG) transmission information - 0, 2, 4, 6, or 8 bits
- Phase-tracking reference signal (PTRS)-demodulation reference signal (DMRS) association - 0 or 2 bits.
- beta_offset indicator - 0 or 2 bits
- DMRS sequence initialization - 0 or 1 bit A DCI format 1_0 may be used as fallback DCI for scheduling a PDSCH, and a CRC may be scrambled by a C-RNTI in this example. The DCI format 1_0, the CRC of which is scrambled by the C-RNTI, may include, for example, the following pieces of information.

TABLE 5

- Identifier for DCI formats - [1] bit
- Frequency domain resource assignment - $[\lceil \log_2(N_{RB}^{DL,BWP} (N_{RB}^{DL,BWP} + 1)/2)\rceil]$ bits TABLE 5-continued

- Time domain resource assignment - 4 bits
- VRB-to-PRB mapping - 1 bit
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- Physical uplink control channel (PUCCH) resource indicator - 3 bits
- PDSCH-to-HARQ feedback timing indicator - [3] bits A DCI format 1_1 may be used as non-fallback DCI for scheduling a PDSCH, and a CRC may be scrambled by a C-RNTI in this example. The DCI format 1_1, the CRC of which is scrambled by the C-RNTI, may include, for example, the following pieces of information.

TABLE 6

- Carrier indicator - 0 or 3 bits
- Identifier for DCI formats - [1] bits
- Bandwidth part indicator - 0, 1 or 2 bits
- Frequency domain resource assignment
  o For resource allocation type 0, $\lceil N_{RB}^{DL,BWP}/P \rceil$ bits
  o For resource allocation type 1, $\lceil \log_2 (N_{RB}^{DL,BWP} (N_{RB}^{DL,BWP} + 1)/2) \rceil$ bits
- Time domain resource assignment - 1, 2, 3, or 4 bits
- VRB-to-PRB mapping - 0 or 1 bit, only for resource allocation type 1.
  o 0 bit if only resource allocation type 0 is configured;
  o 1 bit otherwise.
- Physical resource block (PRB) bundling size indicator - 0 or 1 bit
- Rate matching indicator - 0, 1, or 2 bits
- Zero power (ZP) channel state information-reference signal (CSI-RS) trigger - 0, 1, or 2 bits
For transport block 1:
- Modulation and coding scheme - 5 bits
- New data indicator - 1 bit
- Redundancy version - 2 bits
For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmission configuration indication (TCI) - 0 or 3 bits
- SRS request - 2 bits
- Code block group (CBG) transmission information - 0, 2, 4, 6, or 8 bits
- CBG flushing out information - 0 or 1 bit
- DMRS sequence initialization - 1 bit In the following description, a PDCCH in a 5G communication system will be described in more detail with reference to the accompanying drawings.

Figure 4:
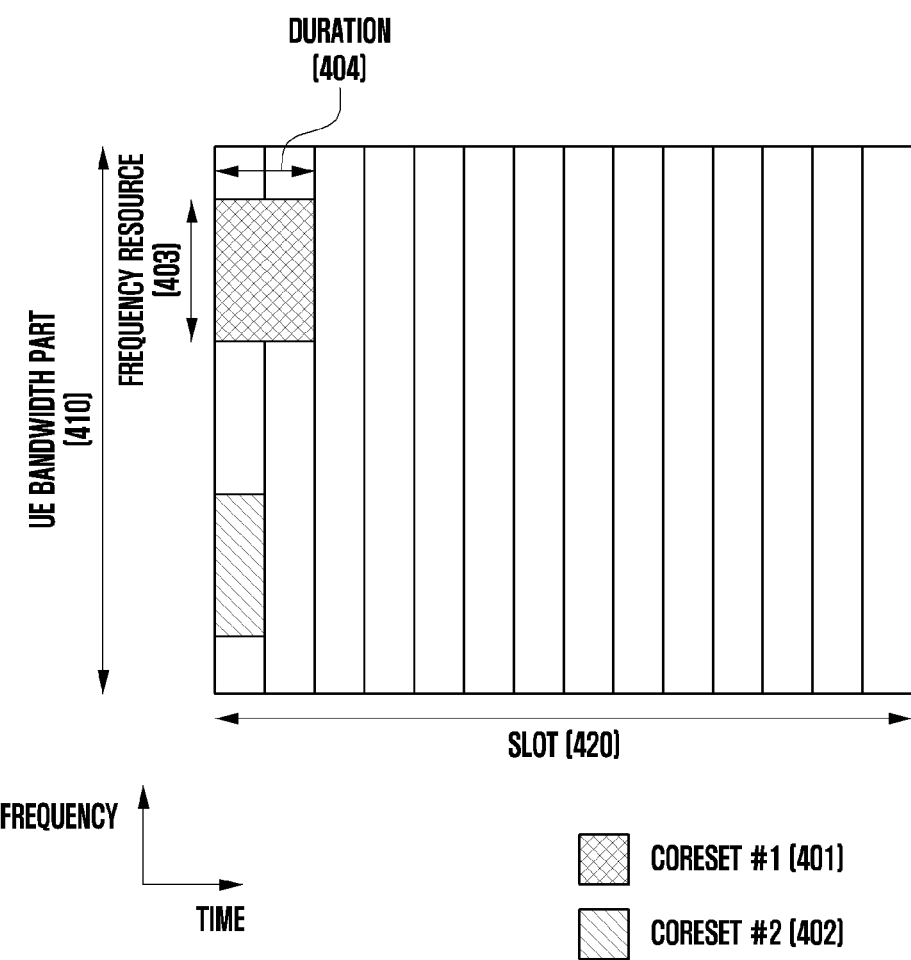
FIG. 4 illustrates a view of an example of configuration of a control resource set (CORESET) of a PDCCH in a 5G system.

FIG. 4 illustrates a view of an example of a CORESET for transmission of a PDCCH in a 5G communication system. More specifically, FIG. 4 illustrates an example in which a terminal BWP 410 is configured on the frequency axis and two CORESETs (a CORESET #1 401 and a CORESET #2 402) are configured in one slot 420 on the time axis. The CORESETs 401 and 402 may be configured for a particular frequency resource 403 in the entire terminal bandwidth part 410 on the frequency axis. The CORESETs 401 and 402 may be configured as one or more OFDM symbols on the time axis, which may be defined as a CORESET duration 404. In an example of FIG. 4, the CORESET #1 401 is configured as a CORESET duration of two symbols, and the CORESET #2 402 is configured as a CORESET duration of one symbol.

The above-described CORESET in the 5G system may be configured for the terminal through higher-layer signaling (e.g., SI, a MIB, or RRC signaling) by the base station. The configuration of a CORESET for the terminal signifies that information is provided to the terminal, wherein the information includes a CORESET identity, a frequency location of a CORESET, a symbol length duration of a CORESET, and the like. For example, the information provided to the terminal may include the following pieces of information.

TABLE 7

ControlResourceSet ::=                                          SEQUENCE {
    -- Corresponds to L1 parameter 'CORESET-ID'
    controlResourceSetId                                        ControlResourceSetId,
    (CORESET identity)

TABLE 7-continued

```
        frequencyDomainResources                          BIT STRING
(SIZE (45)),
    (frequency-axis resource allocation information)
        duration                                          INTEGER
(1..maxCoReSetDuration),
    (time-axis resource allocation information)
        cce-REG-MappingType                               CHOICE {
    (CCE-to-REG mapping type)
            interleaved
        SEQUENCE {
            reg-BundleSize
        ENUMERATED {n2, n3, n6},
        (REG bundle size)
            precoderGranularity
            ENUMERATED {sameAsREG-bundle, allContiguousRBs},
                interleaverSize
            ENUMERATED {n2, n3, n6}
                (interleaver size)
                shiftIndex
            INTEGER(0..maxNrofPhysicalResourceBlocks-1)
                                                          OPTIONAL
            (interleaver shift)
        },
            nonInterleaved                                NULL
        },
        tci-StatesPDCCH
        SEQUENCE(SIZE (1..maxNrofTCI-StatesPDCCH)) OF TCI-StateId
            OPTIONAL,
    (QCL configuration information)
            tci-PresentInDCI                              ENUMERATED
{enabled}
                OPTIONAL,                     -- Need S
}
```

In Table 7, the tci-StatesPDCCH (simply referred to as "TCI state") configuration information may include information of one or more synchronization signal (SS)/PBCH block indices or channel state information-reference signal (CSI-RS) indices which are in a quasi-co-located (QCL) relationship with a DMRS transmitted on a corresponding CORESET.

Figure 5:
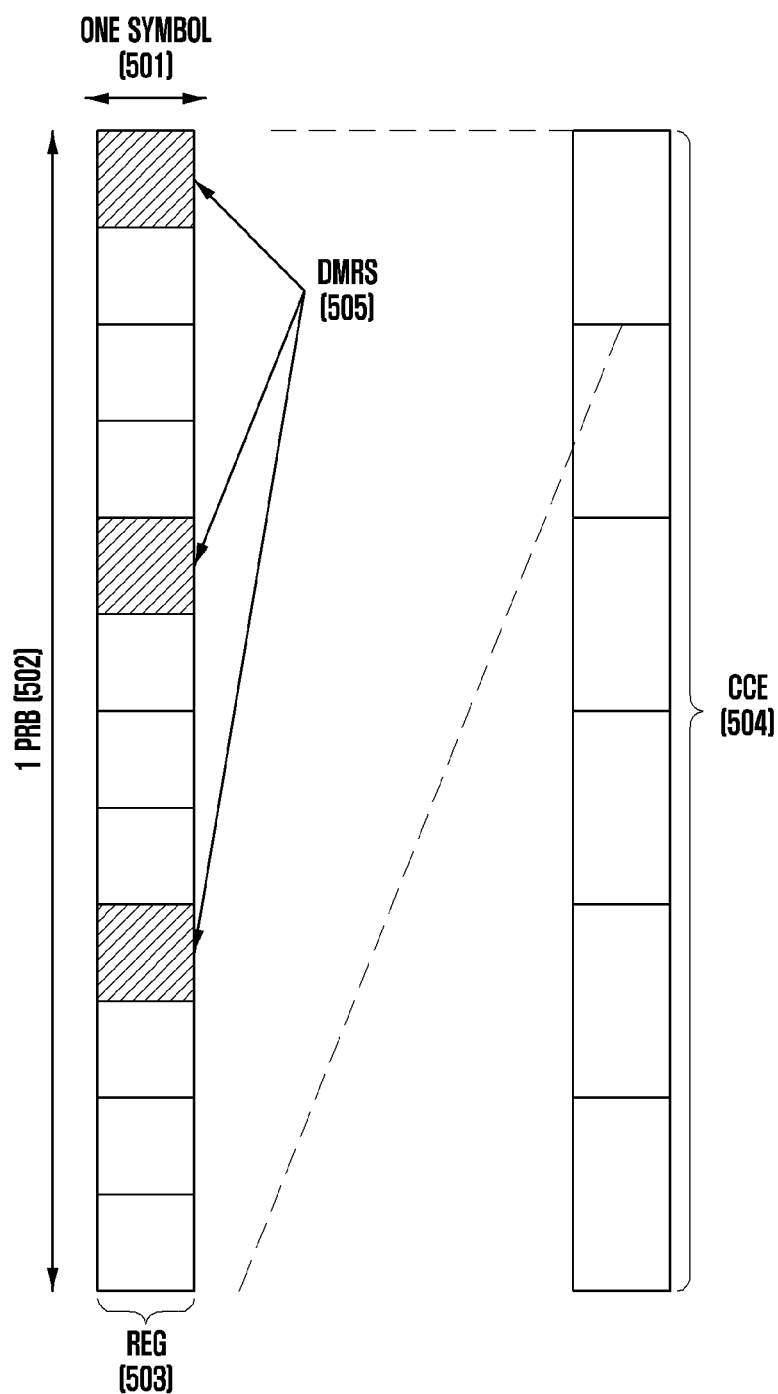
FIG. 5 illustrates a view of a structure of a PDCCH in a 5G system.

FIG. 5 illustrates a view of an example of a basic unit of time and frequency resources constituting a PDCCH usable in a 5G system. Referring to FIG. 5, a basic unit of time and frequency resources constituting a control channel is referred to as a "resource element group (REG)" 503, wherein the REG 503 may be defined as one OFDM symbol 501 on the time axis and may be defined as one physical resource block (PRB) 502 (e.g., 12 subcarriers) on the frequency axis. A PDCCH allocation unit may be configured by concatenating the REGs 503.

As illustrated in FIG. 5, when a basic unit, in which a PDCCH is allocated, is a control channel element (CCE) 504 in the 5G system, one CCE 504 may include multiple REGs 503. The REG 503 illustrated in FIG. 5 is described as an example. The REG 503 may include 12 REs, and if one CCE 504 includes six REGs 503, the one CCE 504 may include 72 REs. When a DL CORESET is configured, the relevant DL CORESET may include multiple CCEs 504, a particular PDCCH may be mapped to one or more CCEs 504 according to aggregation levels (ALs) in the CORESET, and the PDCCH mapped to the one or more CCEs 504 may be transmitted. The CCEs 504 in the CORESET are distinguished by numbers, and in this example, the numbers may be assigned according to a logical mapping scheme.

A basic unit (e.g., the REG 503) of a PDCCH illustrated in FIG. 5 may include: REs to which DCI is mapped, and all regions to which DMRSs 505, which are reference signals for decoding of the REGs, are mapped. As illustrated in FIG. 5, the three DMRSs 505 may be transmitted in the one REG 503.

The numbers of CCEs necessary to transmit a PDCCH may be 1, 2, 4, 8, and 16 according to the ALs, and the different numbers of CCEs may be used to implement link adaptation of a PDCCH. For example, when AL=L, one PDCCH may be transmitted through L CCEs. A terminal should detect a signal in a state in which the terminal does not know information on a PDCCH, and this configuration is referred to as "blind-decoding". A search space representing a set of CCEs is defined for blind-decoding. A search space is a set of PDCCH candidates including CCEs that the terminal should attempt to decode at a given AL, and there are multiple ALs which cause 1, 2, 4, 8, and 16 CCEs to form respective groups. Therefore, the terminal has multiple search spaces. A search space set may be defined as a set of search spaces at all configured ALs.

Search spaces may be classified into a common search space and a UE-specific search space. A specific group of terminals or all terminals may search a common search space of a PDCCH in order to receive dynamic scheduling for SI or cell-common control information such as a paging message. For example, the terminal may search a common search space of a PDCCH, and thus may receive PDSCH scheduling allocation information for transmission of a SIB including operator information and the like of a cell. Since a specific group of terminals or all terminals should receive a PDCCH, a common search space may be defined as a set of pre-agreed CCEs. Further, the terminal may search a UE-specific search space of a PDCCH, and thus may receive scheduling allocation information on a UE-specific PDSCH or PUSCH. A UE-specific search space is a function of an identity of a terminal and various system parameters, and may be defined to be UE-specific.

In the 5G system, a parameter of a search space of a PDCCH may be configured for the terminal by the base station through higher-layer signaling (e.g., SIB, MIB, or RRC signaling). For example, the base station may configure, for the terminal, the number of PDCCH candidates at each aggregation level L, a cycle for monitoring of a search space, occasion of monitoring of a search space in the unit of symbol in a slot, a search space type (common search space or UE-specific search space), a combination of an RNTI and a DCI format desired to be monitored in a corresponding search space, an index of a CORESET in which a search space is to be monitored, and the like. For example, the information on a search space configured for the terminal by the base station may include the following pieces of information.

The base station may configure one or more search space sets for the terminal according to the configuration information. As an example, the base station may configure a search space set 1 and a search space set 2 for the terminal, may configure the terminal so as to monitor a DCI format A, scrambled by an X-RNTI in the search space set 1, in a common search space, and may configure the terminal so as to monitor a DCI format B, scrambled by a Y-RNTI in the search space set 2, in a UE-specific search space.

According to the above-described configuration information, one or more search space sets may exist in a common

TABLE 8

```
SearchSpace ::=                                    SEQUENCE {
      -- Identity of the search space. SearchSpaceId = 0 identifies the SearchSpace
configured via PBCH (MIB) or ServingCellConfigCommon.
      searchSpaceId                                SearchSpaceId,
  (search space identity)
      controlResourceSetId                         ControlResourceSetId,
  (CORESET identity)
      monitoringSlotPeriodicityAndOffset           CHOICE {
  (monitoring slot level periodicity)
            sl1
                  NULL,
            sl2
                  INTEGER (0..1),
            sl4
                  INTEGER (0..3),
            sl5
            INTEGER (0..4),
            sl8
                  INTEGER (0..7),
            sl10
            INTEGER (0..9),
            sl16
            INTEGER (0..15),
            sl20
            INTEGER (0..19)
      }
                                                   OPTIONAL,
      duration (monitoring duration)               INTEGER (2..2559)
         monitoringSymbolsWithinSlot                BIT   STRING
(SIZE (14))
            OPTIONAL,
      (monitoring symbol in slot)
         nrofCandidates
         SEQUENCE {
      (number of PDCCH candidates for each aggregation level)
            aggregationLevel1
            ENUMERATED {n0, n1, n2, n3, n4, n5, n6, n8},
            aggregationLevel2
            ENUMERATED {n0, n1, n2, n3, n4, n5, n6, n8),
            aggregationLevel4
            ENUMERATED {n0, n1, n2, n3, n4, n5, n6, n8},
            aggregationLevel8
            ENUMERATED {n0, n1, n2, n3, n4, n5, n6, n8),
            aggregationLevel16                    ENUMERATED
{n0, n1, n2, n3, n4, n5, n6, n8}
      },
      searchSpaceType                              CHOICE {
      (search space type)
         -- Configures this search space as common search space (CSS) and DCI
formats to monitor.
            common
            SEQUENCE {
            (common search space)
      }
            ue-Specific
            SEQUENCE {
            (UE-specific search space)
                 -- Indicates whether the UE monitors in this USS for DCI
formats 0-0 and 1-0 or for formats 0-1 and 1-1.
                  formats
            ENUMERATED {formats0-0-And-1-0, formats0-1-And-1-1},
                  ...
            }
``` search space or a UE-specific search space. For example, search space set #1 and search space set #2 may be configured as a common search space, and search space set #3 and search space set #4 may be configured as a UE-specific search space.

The following combination of a DCI format and an RNTI may be monitored in a common search space:

DCI format 0_0/1_0 with CRC scrambled by cell-RNTI (C-RNTI), configured scheduling RNTI (CS-RNTI), semi-persistent (SP)-CSI-RNTI, random access RNTI (RA-RNTI), temporary cell RNTI (TC-RNTI), paging RNTI (P-RNTI), system information RNTI (SI-RNTI);

DCI format 2_0 with CRC scrambled by slot format indicator (SFI)-RNTI;

DCI format 2_1 with CRC scrambled by interruption RNTI (INT-RNTI);

DCI format 2_2 with CRC scrambled by transmit power control for PUSCH RNTI (TPC-PUSCH-RNTI), transmit power control for PUCCH RNTI (TPC-PUCCH-RNTI); and DCI format 2_3 with CRC scrambled by transmit power control for SRS RNTI (TPC-SRS-RNTI).

The following combination of a DCI format and an RNTI may be monitored in a UE-specific search space:

DCI format 0_0/1_0 with CRC scrambled by C-RNTI, CS-RNTI, TC-RNTI; and

DCI format 1_0/1_1 with CRC scrambled by C-RNTI, CS-RNTI, TC-RNTI.

The above-specified RNTIs may comply with the following definitions and uses.

C-RNTI: use for scheduling UE-specific PDSCH;
TC-RNTI: use for scheduling UE-specific PDSCH;
CS-RNTI: use for semi-statically configured UE-specific PDSCH scheduling;
RA-RNTI: use for scheduling PDSCH at random access stage;
P-RNTI: use for scheduling PDSCH for transmission of paging;
SI-RNTI: use for scheduling PDSCH for transmission of SI;
INT-RNTI: use for notifying of whether PDSCH is punctured;
TPC-PUSCH-RNTI: use for indicating power control command for PUSCH;
TPC-PUCCH-RNTI: use for indicating power control command for PUCCH; and
TPC-SRS-RNTI: use for indicating power control command for SRS.

The above-specified DCI formats may comply with the following definitions.

TABLE 9

| DCI format | Use |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

Hereinafter, a 5G system will be described by way of example, but embodiments may also be applied to other communication systems having similar technical backgrounds or channel forms. For example, LTE or LTE-A mobile communication and mobile communication technology to be developed subsequent to the 5G system may be included in other communication systems. Therefore, according to the determination of those skilled in the art, embodiments may also be applied to other communication systems through partial modification without largely departing from the scope of the disclosure.

Further, in the following description of the disclosure, a detailed description of known functions or configurations incorporated herein will be omitted when the same may make the subject matter of the disclosure rather unclear. The terms which will be described below are defined in consideration of the functions in the disclosure, and may be different according to the intention or practice of users and operators. Therefore, the definitions of the terms should be made based on the contents throughout the specification.

In the following description, a method for allocating a time domain to a PDSCH or a PUSCH in a 5G communication system will be described in detail.

In the 5G system, time-domain resource allocation information for a PDSCH and a PUSCH may be indicated using DCI.

For example, the following pieces of resource allocation-related information may be indicated for a PDSCH.

$k_0$: Slot offset (an offset value relative to a slot in which DCI indicating the position of a slot, in which a PDSCH is scheduled, is received);

mappingType (mapping type): PDSCH mapping type A or B (a position of a DMRS and a candidate of a supportable PDSCH symbol length may be determined according to a mapping type); and startSymbolAndLength (start symbol and length): the position of a start symbol and a symbol length in a slot of a PDSCH.

For example, the following pieces of resource allocation-related information may be indicated for a PUSCH.

$k_2$: Slot offset (an offset value relative to a slot in which DCI indicating the position of a slot, in which a PUSCH is scheduled, is received);

mappingType: PUSCH mapping type A or B (a position of a DMRS and a candidate of a supportable PUSCH symbol length may be determined according to a mapping type); and startSymbolAndLength: the position of a start symbol and a symbol length in a slot of a PUSCH.

Figure 6:
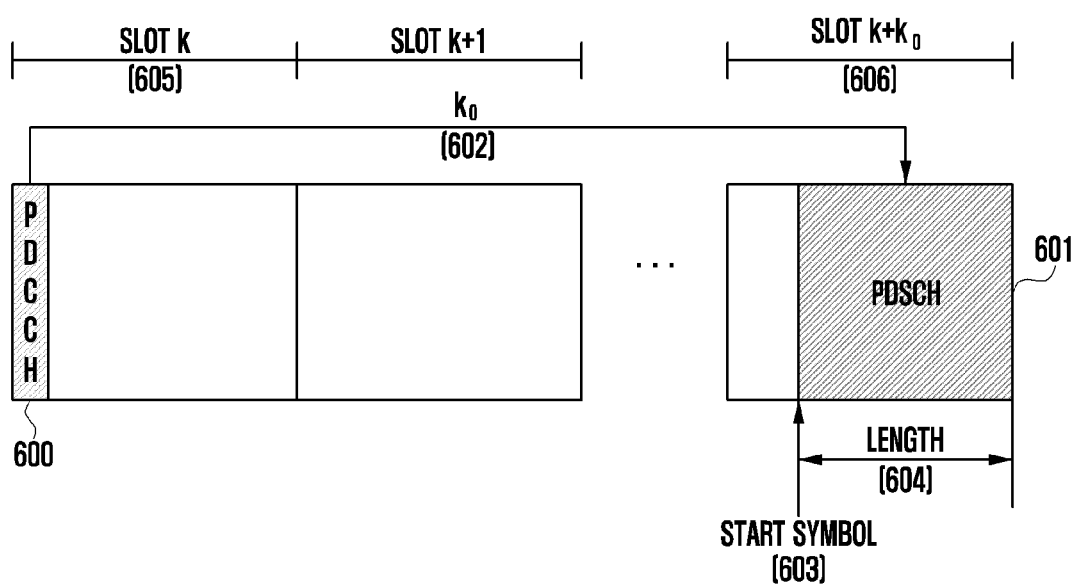
FIG. 6 illustrates a view of an example of a method for allocating time-domain resources for a data channel in a 5G system.

FIG. 6 illustrates a view of an example of a time-domain resource allocation for a PDSCH in a 5G system. A terminal may acquire DCI from a PDCCH 600, and may acquire, from the DCI, scheduling information for a PDSCH 601 and time-domain resource allocation information therefor. The DCI may be used to indicate, to the terminal, the value of a slot offset $k_0$ 602 corresponding to an index of a slot in which the PDSCH 601 is scheduled, that is, an interval between a slot in which the PDCCH 600 has been received, and a slot in which the PDSCH 601 is scheduled. In an example of FIG. 6, when a time point of reception of the PDCCH 600 corresponds to a k-th slot 605 and a slot offset value received with notification is $k_0$ 602, the PDSCH 601 may be scheduled in a (k+$k_0$) slot. The terminal may additionally acquire, from the DCI, information on a position 603 of a start symbol of the PDSCH 601 and a symbol length 604 (referred to as "start and length indicator value (SLIV)"), and accordingly, may recognize time-domain allocation information in a slot of the PDSCH 601.

A base station may pre-configure, as a table, a set of pieces of time-domain resource allocation information which can be indicated to the terminal by using DCI through higher-layer signaling. That is, the base station may configure, as a table, a total of N (≥1) pieces of time-domain resource allocation information ($k_0$ or $k_2$, mappingType, and startSymbolAndLength) for the terminal through higher-layer signaling, and may dynamically indicate one of a total of N entries to the terminal by using DCI.

For example, for the terminal, the base station may configure, as parameters in Table 10 below, a table including pieces of time-domain resource allocation information for a PDSCH. A maximum of maxNrofDL-Allocations (=16) entries may be configured, and one of the entries may be indicated from the base station to the terminal by using a maximum of $\log_2$(maxNrofDL-Allocations) (=4) bits included in DCI.

TABLE 10

```
PDSCH-TimeDomainResourceAllocationList ::=   SEQUENCE (SIZE(1..maxNrofDL-
Allocations)) OF PDSCH-TimeDomainResourceAllocation
PDSCH-TimeDomainResourceAllocation ::=       SEQUENCE {
    k0                                       INTEGER(0..32)
OPTIONAL,   -- Need S
    mappingType                              ENUMERATED {typeA,
typeB},
    startSymbolAndLength                     INTEGER (0..127)
}
```

Similarly, for the terminal, the base station may configure, as parameters in Table 11 below, a table including pieces of time-domain resource allocation information for a PUSCH. A maximum of maxNrofUL-Allocations (=16) entries may be configured, and one of the entries may be indicated from the base station to the terminal by using a maximum of log 2(maxNrofUL-Allocations) (=4) bits included in DCI.

TABLE 11

```
PUSCH-TimeDomainResourceAllocationList ::=       SEQUENCE
(SIZE(1..maxNrofUL-Allocations)) OF PUSCH-TimeDomainResourceAllocation
PUSCH-TimeDomainResourceAllocation ::=           SEQUENCE {
    k2                                           INTEGER(0..32)
OPTIONAL,   -- Need S
    mappingType                                  ENUMERATED {typeA,
typeB},
    startSymbolAndLength                         INTEGER (0..127)
}
```

In describing the disclosure, terms for the following two scheduling schemes will be defined.
Self-slot scheduling: when a slot in which a PDCCH is received is identical to a slot in which a PDSCH (or a PUSCH) is scheduled, that is, $k_0$ (or $k_2$)=0.
Cross-slot scheduling: when a slot in which a PDCCH is received is different from a slot in which a PDSCH (or a PUSCH) is scheduled, that is, $k_0$ (or $k_2$)>0.

In the following description, a sleep mode of a terminal will be described.

During a time period T in which the terminal does not have to perform any transmission/reception, the terminal operates in a sleep mode, and thus can minimize power consumption. According to the length of a time period T in which the terminal can operate in a sleep mode, the terminal may operate in one of the following three sleep modes.
Deep sleep is a sleep mode in which the terminal may operate when $T > T_{ds}$. In the deep-sleep mode, the terminal may operate with the lowest power consumption and performs only a minimum baseband operation, and a radio frequency (RF) circuit may also become deactivated. In order for the terminal, which operates in the deep-sleep mode, to operate in an active mode (e.g., an active mode for execution of transmission/reception), the terminal may require a relatively long transient time. $T_{ds}$ may be defined as a minimum time period required for the terminal to operate in the deep-sleep mode.
Light sleep may correspond to a sleep mode in which the terminal may operate when $T_{ls} < T \le T_{ds}$. The light-sleep mode allows the terminal to operate with low power consumption, and may require a shorter transient time than the deep-sleep mode. $T_{ls}$ may be defined as a minimum time period required for the terminal to operate in the light-sleep mode.
Micro sleep may correspond to a sleep mode in which the terminal may operate when $T_{ms} < T \le T_{ls}$. The micro-sleep mode allows the terminal to operate with relatively low power consumption, and a transient time required to switch from the micro-sleep mode to the active mode may be very short or zero. $T_{ms}$ may be defined as a minimum time period required for the terminal to operate in the micro-sleep mode.

Based on the above-described definitions, depending on the length of a time period T in which the terminal can operate in a sleep mode, the terminal may operate in at least one sleep mode among the deep-sleep mode, the light-sleep mode, and the micro-sleep mode. Hereinafter, in describing the disclosure, the deep-sleep mode, the light-sleep mode, and the micro-sleep mode will not be distinguished from one another, and will be collectively referred to as a "sleep mode".

In order to reduce power consumed by the terminal, when the terminal does not acquire scheduling DCI for a PDSCH or a PUSCH, the terminal, which has blind-decoded a PDCCH at a particular time point, operates in a micro-sleep mode in a corresponding slot, and thus can minimize unnecessary power consumption. The disclosure proposes a method and an apparatus for controlling a micro-sleep mode of a terminal in consideration of cross-slot scheduling.

First Embodiment

A first embodiment proposes a method for controlling a sleep mode of a terminal based on time-domain resource allocation information acquired from DCI.

The terminal may perform monitoring, that is, blind-decoding, of a PDCCH at a particular time point, and accordingly, may acquire scheduling information for a data channel, that is, a PDSCH or a PUSCH. In this example, a sleep mode operation of the terminal may be controlled according to, for example, whether the corresponding scheduling is self-slot scheduling or cross-slot scheduling, based on time-domain resource allocation information for the PDSCH or the PUSCH.

Figure 7:
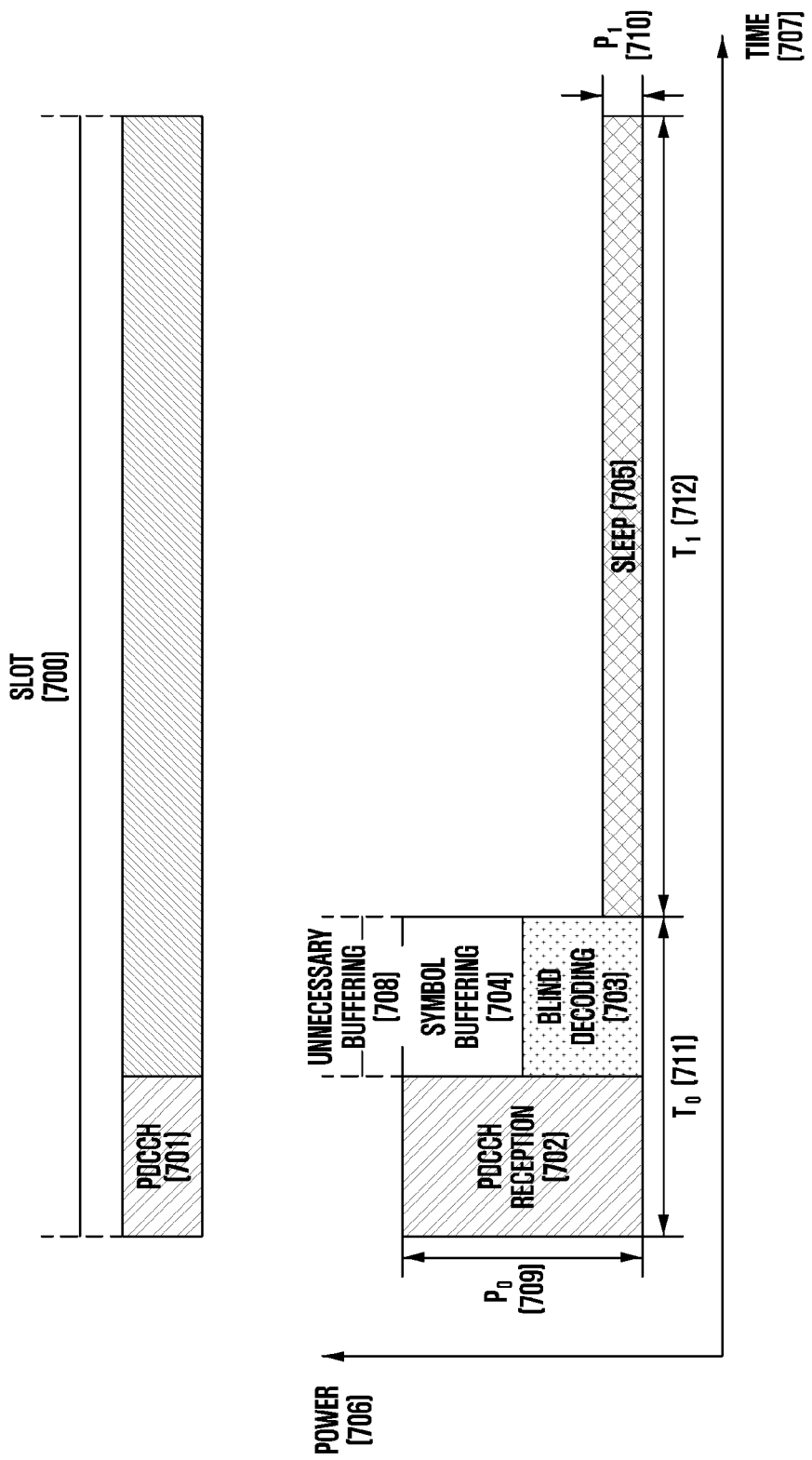
FIG. 7 illustrates a view of an example according to a first embodiment.

FIG. 7 illustrates a view of an example according to the first embodiment.

Referring to FIG. 7, the terminal may monitor a PDCCH 701 in a slot 700. An operation of blind-decoding a PDCCH by the terminal is described in more detail. The terminal may first receive a symbol for a PDCCH (as indicated by reference numeral 702). That is, this configuration can be understood to mean reception of a time period and a frequency band signal to which the PDCCH can be mapped. As described above, a time period and a frequency band, to which the PDCCH can be mapped, may be configured by a higher-layer signaling transmitted by the base station. The terminal may receive the symbol for the PDCCH, and then may blind-decode the received PDCCH (as indicated by reference numeral 703). In this example, a blind-decoding operation may include a series of processes, such as channel estimation, channel equalization, and channel decoding.

In this example, while the terminal blind-decodes the PDCCH, the terminal may buffer a symbol transmitted in the corresponding time period (as indicated by reference numeral 704). The term "buffering" refers to an operation of the terminal for storing, in a buffer of the terminal, a received signal while performing the blind-decoding. This is because, when the terminal completes the blind-decoding of the PDCCH (as indicated by reference numeral 703) and then acquires scheduling DCI for a PDSCH, the PDSCH is likely to be scheduled in the buffered symbol (as indicated by reference numeral 704). When the terminal completes the blind-decoding of the PDCCH (as indicated by reference numeral 703) and then fails to acquire the DCI, that is, when the base station has not transmitted DCI to the terminal in a corresponding slot, the terminal may operate in a sleep mode (as indicated by reference numeral 705) from a time point after the terminal completes the blind decoding of the PDCCH (as indicated by reference numeral 703). Further, the terminal may discard the buffered symbol (as indicated by reference numeral 704).

When the terminal completes the blind-decoding of the PDCCH (as indicated by reference numeral 703) and then acquires the DCI, the terminal may adjust a sleep mode according to information of the acquired DCI. If the DCI indicates self-slot scheduling for the PDSCH or the PUSCH, the terminal may transmit or receive the PDSCH or the PUSCH in the corresponding slot (i.e., a slot in which the DCI is received) according to indication in the DCI. In this example, if the DCI indicates self-slot scheduling for the PDSCH, the terminal may acquire DL data from the buffered symbol (as indicated by reference numeral 704). If the DCI indicates cross-slot scheduling for the PDSCH or the PUSCH, the terminal may operate in a sleep mode (as indicated by reference numeral 705) during the remaining time period of the corresponding slot.

In an example of FIG. 7, a power consumption amount in an active mode state of the terminal is represented by $P_0$ 709, a time period during which the terminal operates in an active mode is represented by $T_0$ 711, a power consumption amount in a sleep mode state is represented by $P_1$ 710, and a time period during which the terminal operates in a sleep mode is represented by $T_1$ 712. In this example, it is usual that $P_0$ 709>$P_1$ 710, and a total consumed power amount in a slot of the terminal may be calculated as $P_0T_0+P_1T_1$. Therefore, according to an increase in the time period $T_1$ 712 during which the terminal operates in the sleep mode, a decreasing amount of power consumption of the terminal may be increased. According to the first embodiment, the sleep mode of the terminal is controlled, so as to minimize an unnecessary active mode of the terminal and allow the terminal to operate in the sleep mode, thereby enabling a reduction in power consumed by the terminal.

Figure 8:
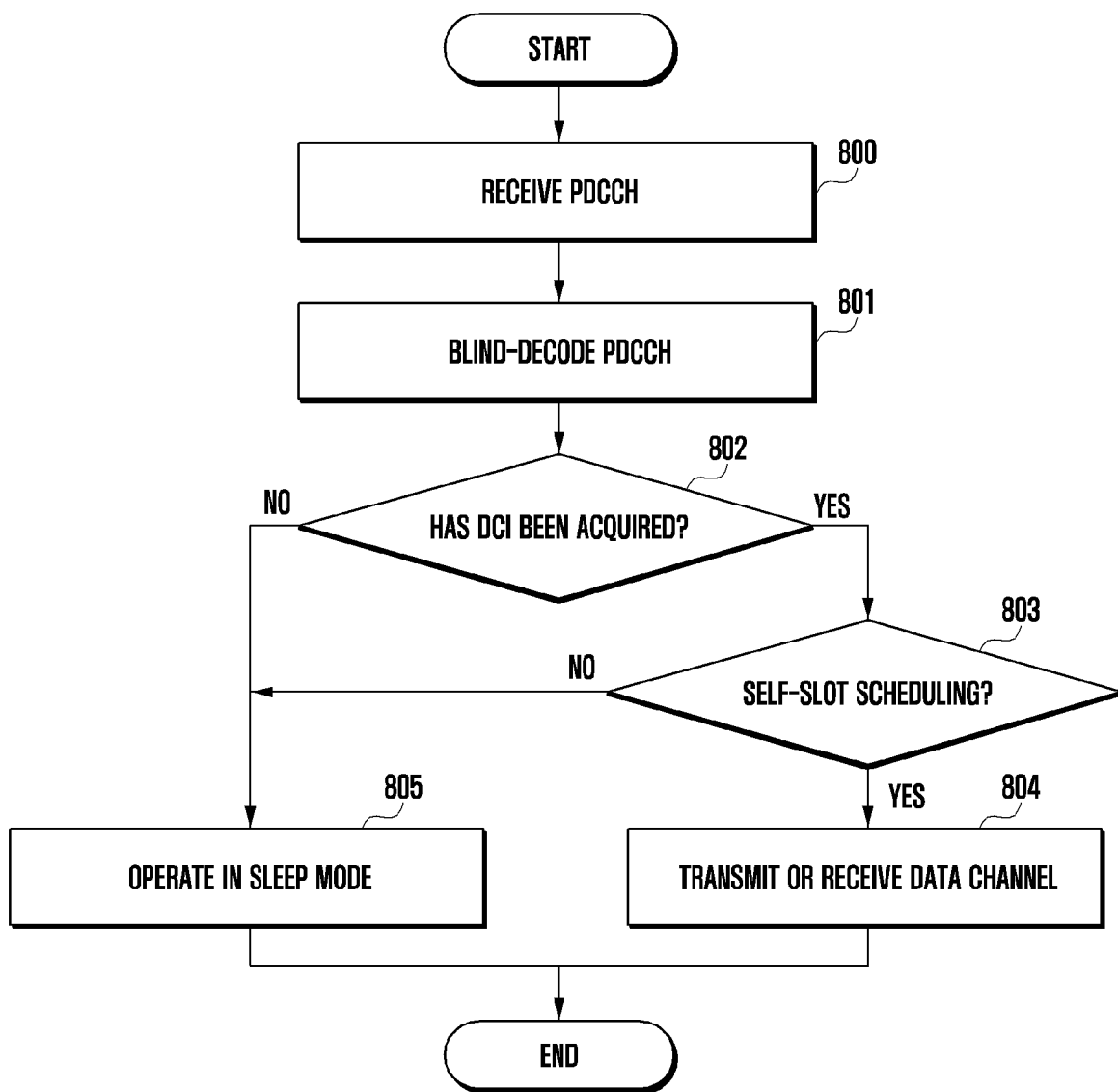
FIG. 8 illustrates a flowchart of an operation of a terminal according to the first embodiment.

FIG. 8 illustrates a flowchart illustrating an operation of a terminal according to the first embodiment.

In operation 800, the terminal may receive a PDCCH. The reception of the PDCCH can be understood as a process in which the terminal receives a signal transmitted by a base station on a resource to which a PDCCH signal can be mapped and which is determined through higher-layer signaling. Alternatively, the reception of the PDCCH can be understood as a process of receiving a PDCCH signal transmitted by the base station. In operation 801, the terminal may blind-decode the received PDCCH. In operation 802, the terminal may determine whether DCI has been acquired as a result of the blind-decoding. If it is determined in operation 802 that the DCI has not been acquired, in operation 805, the terminal may operate in a sleep mode. If it is determined in operation 802 that the DCI has been acquired, in operation 803, the terminal may determine whether self-slot scheduling is configured, based on time resource allocation information for a PDSCH or a PUSCH within the acquired DCI. If it is determined in operation 803 that the self-slot scheduling is configured for the terminal, the terminal may transmit or receive the PDSCH or the PUSCH in a slot in which the PDCCH has been received, based on the acquired scheduling information. If it is determined in operation 803 that the self-slot scheduling is not configured for the terminal by the DCI (i.e., if it is determined that cross-slot scheduling is configured), the terminal may operate in the sleep mode during the remaining time period of the corresponding slot.

Embodiment 1-1

According to the first embodiment, the terminal, which is to operate in a sleep mode in a particular slot (e.g., slot n), may additionally determine whether the terminal should perform a pre-configured or indicated operation (e.g., transmission/reception of another channel or signal) in slot n. If the terminal should perform a pre-configured or indicated operation in slot n, the terminal does not operate in the sleep mode, but may perform the relevant operation. If there is no pre-configured or indicated operation that the terminal should perform in slot n, the terminal may operate in the sleep mode. The above-described pre-configured or indicated operation may correspond to at least one of, for example, the following operations of a terminal.

Operation of receiving a PDSCH scheduled in slot n (according to a PDCCH transmitted in a slot other than slot n);
Operation of transmitting a PUSCH scheduled in slot n (according to a PDCCH transmitted in a slot other than slot n);
Reception of a PDSCH configured as semi-persistent scheduling (SPS) so as to be performed in slot n;
PUSCH transmission configured as a configured grant (CG) so as to be performed in slot n;
Transmission of reception acknowledgement information (HARQ-ACK) for a PDSCH;
Reception and measurement of an SS/PBCH block or a CSI-RS;
Reporting of channel state measurement and transmission of a measurement report;
Transmission of a scheduling request of the terminal; and
Transmission of a periodic, semi-persistent, or aperiodic sounding reference signal (SRS) of the terminal.

Second Embodiment

In the embodiment in FIG. 7, when a terminal receives a PDCCH (as indicated by reference numeral 702) and then blind-decodes the relevant PDCCH (as indicated by reference numeral 703) in the same slot immediately after an operation of receiving the PDCCH, the terminal essentially buffers a symbol (as indicated by reference numeral 704) transmitted during a time period in which the terminal blind-decodes the PDCCH. If a PDSCH scheduled in the corresponding slot does not exist, the terminal may discard the buffered symbol. In this example, execution of an unnecessary buffering operation 708 by the terminal results in a waste of power. That is, in a state in which the terminal does not know time-domain resource allocation information for a PDSCH, minimization of power consumption due to unnecessary symbol buffering by the terminal may help to reduce power consumed by the terminal. Further, the terminal may simultaneously perform an operation of receiving and buffering a symbol and an operation of blind-decoding the PDCCH. Therefore, if the terminal is allowed to simultaneously blind-decode the PDCCH during a time period in which the PDCCH is received, a time period in which the terminal operates in an active mode may be minimized, and thus power consumed by the terminal can be minimized.

A base station may configure a table for time-domain resource allocation, for the terminal through higher-layer signaling. The base station may configure, for the terminal, a table for time-domain resource allocation so as to include a total of N (≥1) entries, and a particular value in the configured table may be indicated to the terminal by using DCI.

The second embodiment proposes a method for changing a time point at which a PDCCH is blind-decoded, in order to maximize a sleep mode period based on the configured time-domain resource allocation information.

Figure 9:
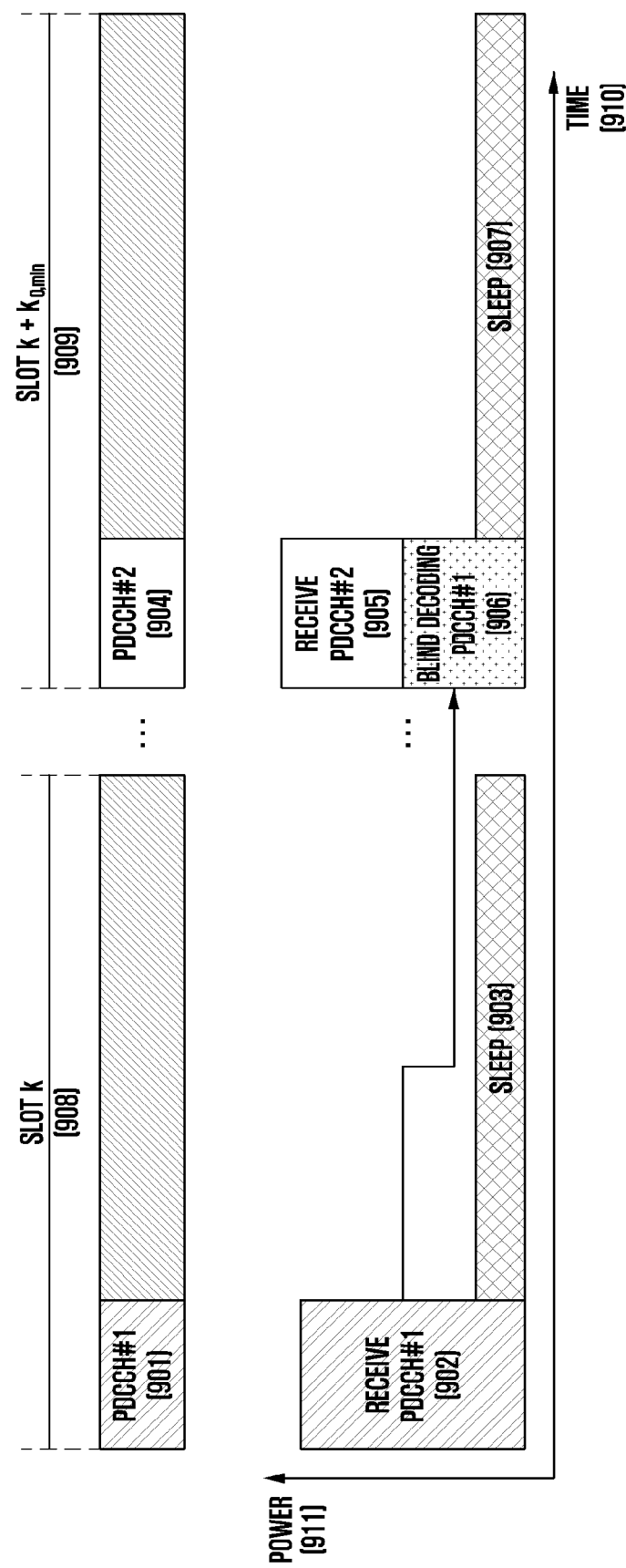
FIG. 9 illustrates a view of an example according to a second embodiment.

FIG. 9 illustrates a view of an example according to the second embodiment.

Referring to FIG. 9, a terminal may receive a PDCCH (which corresponds to a PDCCH #1 901 in the example of FIG. 9) in a k-th slot 908 (as indicated by reference numeral 902). After the terminal receives a symbol for PDCCH #1 (as indicated by reference numeral 902), the terminal does not immediately blind-decode PDCCH #1, but may operate in a sleep mode (as indicated by reference numeral 903). Then, the terminal may blind-decode PDCCH #1 at a subsequent time point, for example, in a (k+k')-th slot 909.

For example, when PDCCH #1 corresponds to a PDCCH through which scheduling DCI for a PDSCH can be transmitted, k' may be determined by Equation 1 below.

$$k' = k_{0,min}$$ Equation 1

In Equation 1, $k_{0,min}$ may correspond to a minimum value among values of $k_0$'s of a table for time-domain resource allocation for a PDSCH, configured through higher-layer signaling. For example, when it is assumed that a base station configures a time-domain resource allocation table for a PDSCH as shown in Table 12 below, $k_{0,min}$ may be 2.

TABLE 12

| Row index | PDSCH mapping type | $k_0$ | Starting symbol | Length |
| --- | --- | --- | --- | --- |
| 1 | type A | 2 | 2 | 12 |
| 2 | type A | 2 | 2 | 10 |
| 3 | type A | 2 | 2 | 9 |
| 4 | type A | 2 | 2 | 7 |
| 5 | type A | 3 | 2 | 5 |
| 6 | type B | 3 | 9 | 4 |
| 7 | type B | 3 | 4 | 4 |
| 8 | type B | 4 | 5 | 7 |
| 9 | type B | 5 | 5 | 2 |
| 10 | type B | 7 | 9 | 2 |
| 11 | type B | 8 | 12 | 2 |
| 12 | type A | 9 | 1 | 13 |
| 13 | type A | 10 | 1 | 6 |
| 14 | type A | 21 | 2 | 4 |
| 15 | type B | 30 | 4 | 7 |
| 16 | type B | 32 | 8 | 4 |

That is, $k_0$,min may refer to a slot at the earliest time point in which a PDSCH can be scheduled and which the terminal can expect. The terminal having received the configuration information as shown in Table 12 may determine that a PDSCH can be scheduled from a slot after a slot indicated by $k_{0,min}=2$ from a slot in which a PDCCH has been received. This determination is the same as determining, by the terminal, that a PDSCH is not scheduled before the slot indicated by $k_{0,min}=2$. Accordingly, the terminal may recognize that DCI, which is used to schedule a PDSCH and can be transmitted through PDCCH #1, does not at least indicate self-slot scheduling, and accordingly, does not have to blind-decode PDCCH #1 and buffer a symbol for PDCCH #1 in the slot in which PDCCH #1 has been received. Therefore, after the terminal receives PDCCH #1, the terminal may postpone blind-decoding of the relevant PDCCH #1 till a time point (i.e., a $(k+k_{0,min})$-th slot) at which a PDSCH can be actually scheduled, and then may perform the same at that time point. By this configuration, it is possible to minimize unnecessary symbol buffering performed simultaneously during a time period in which a PDCCH is blind-decoded.

Therefore, in addition, the terminal may simultaneously perform an operation 905 of receiving a PDCCH #2 904 which is a PDCCH existing in the $(k+k_{0,min})$-th slot 909, and an operation 906 of blind-decoding PDCCH #1. As described above, since the terminal may simultaneously perform an operation of receiving and buffering a symbol and an operation of performing blind-decoding, the terminal may simultaneously perform the reception 905 of PDCCH #2 and the blind-decoding 906 of PDCCH #1, in the $(k+k_{0,min})$-th slot 909, and thus can minimize a time for which the terminal operates in an active mode. That is, a time, for which the terminal operates in a sleep mode, can be maximized.

When the terminal completes the blind-decoding 906 of PDCCH #1 and then fails to acquire DCI in the $(k+k_{0,min})$-th slot 909, that is, when the base station has not transmitted DCI to the terminal in the corresponding slot, the terminal may operate in a sleep mode 907 from a time point after the terminal completes the blind decoding 906 of the PDCCH #1 901.

When the terminal completes the blind-decoding 906 of the PDCCH #1 901 and then acquires DCI in the $(k+k_{0,min})$-th slot 909, the terminal may adjust the sleep mode according to information of the acquired DCI. If a $k_0$ value indicated using the DCI is identical to $k_{0,min}$, the terminal may receive and decode a PDSCH in the $(k+k_{0,min})$-th slot 909 according to indication in the DCI. If the $k_0$ value indicated using the DCI transmitted through the PDCCH #1 901 is greater than $k_{0,min}$, the terminal may blind-decode the PDCCH #1 901 (as indicated by reference numeral 906), and then may operate in the sleep mode 907 during the remaining time period in the $(k+k_{0,min})$-th slot 909.

The above-described operation may be identically applied to a PUSCH.

For example, when PDCCH #1 corresponds to a PDCCH through which scheduling DCI for a PUSCH can be transmitted, k' may be determined as follows.

$$k'=k_{2,min}-\text{ceil}(N2/N) \qquad \text{Equation 2}$$

In Equation 2, $k_2$,min may correspond to a minimum value among values of $k_2$'s of a table for time-domain resource allocation for a PUSCH, configured through higher-layer signaling. N2 may correspond to processing time necessary to transmit a PUSCH after reception of a PDCCH and may correspond to a symbol unit, and N may be defined as the number of symbols per slot. Ceil (x) may be defined as a function for outputting the smallest integer among integers greater than x. According to Equation 2, the terminal may determine a time point of blind-decoding of PDCCH #1, as a time point obtained by simultaneously considering a nearest slot $k_{2,min}$ in which a PUSCH can be scheduled, and processing time N2 necessary to transmit the PUSCH.

In a similar method, when PDCCH #1 corresponds to a PDCCH through which scheduling DCI for a PDSCH or a PUSCH can be transmitted, k' may be determined as follows.

$$k'=\min(k_{0,min}, k_{2,min}-\text{ceil}(N2/N)) \qquad \text{Equation 3}$$

In Equation 3, min(A, B) may correspond to a function for outputting the smaller value among A and B.

Figure 10:
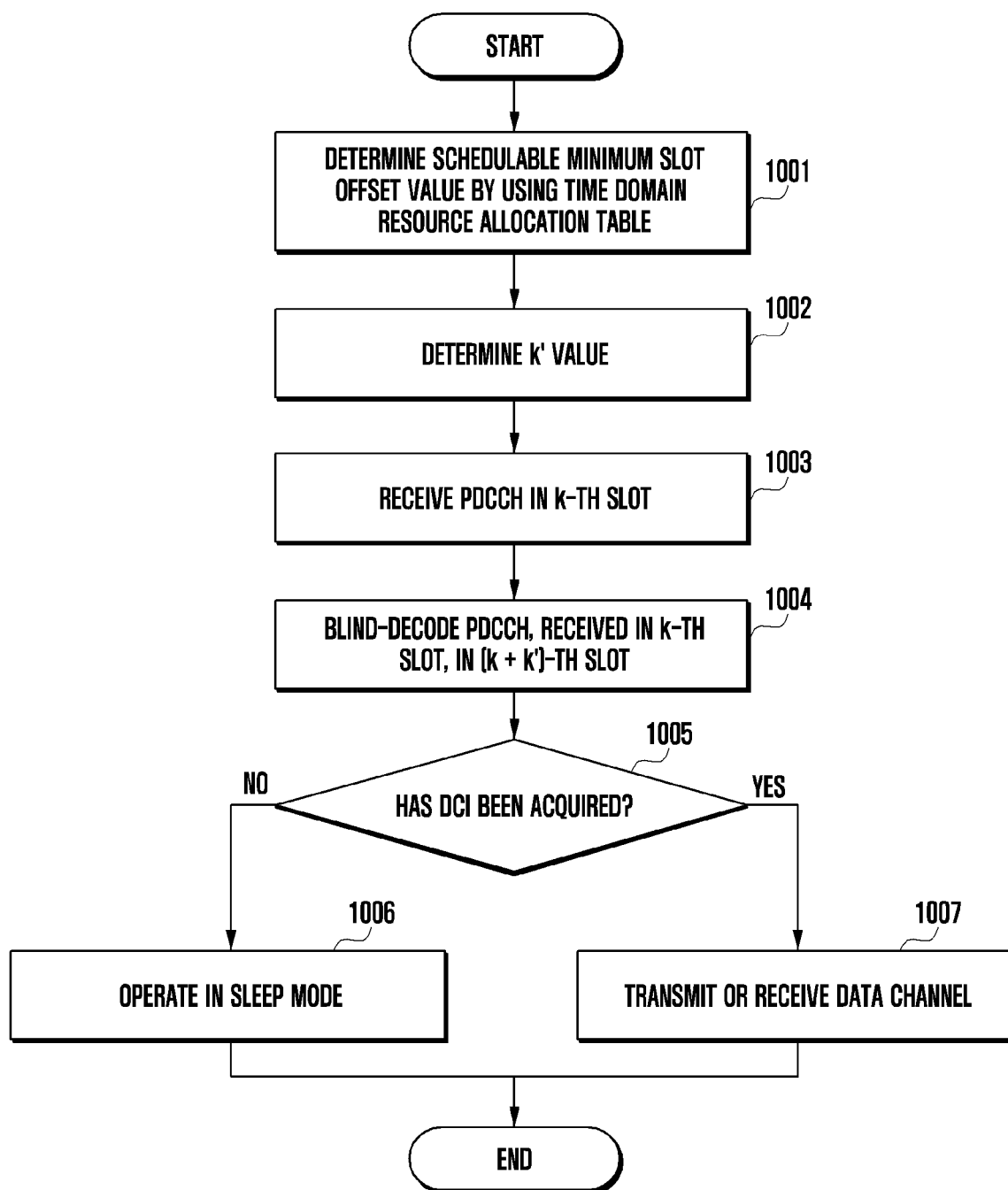
FIG. 10 illustrates a flowchart of an operation of a terminal according to the second embodiment.

FIG. 10 illustrates a flowchart of an operation of a terminal according to the second embodiment.

In operation 1001, a terminal may determine a schedulable minimum slot offset value (i.e., $k_{0,min}$ for a PDSCH, and $k_{2,min}$ for a PUSCH) by using a time-domain resource allocation table configured through higher-layer signaling. In operation 1002, the terminal may determine a k' value by using Equation 1, 2, or 3. In operation 1003, the terminal may receive a PDCCH in a particular slot (e.g., a k-th slot). The reception of the PDCCH can be understood as a process in which the terminal receives a signal transmitted by a base station on a resource to which a PDCCH signal can be mapped and which is determined through higher-layer signaling. Alternatively, the reception of the PDCCH can be understood as a process of receiving a PDCCH signal transmitted by the base station. In operation 1004, the terminal may determine a time point of blind-decoding of the PDCCH received in the k-th slot, and accordingly, may blind-decode the PDCCH, received in the k-th slot, in a (k+k')-th slot. If k'>0, in the k-th slot, the terminal may receive the PDCCH and then may operate in a sleep mode, and in the (k+k')-th slot, may switch from the sleep mode to an active mode so as to blind-decode the PDCCH received in the k-th slot. (If k'=0, in the k-th slot, the terminal may receive the PDCCH, and then may blind-decode the PDCCH and may perform symbol buffering.) After the terminal completes the blind-decoding of the PDCCH in the (k+k')-th slot, in operation 1005, the terminal may determine whether DCI has been acquired. If DCI is not detected in operation 1005, in operation 1006, the terminal may operate in a sleep mode. If the DCI is detected in operation 1005, in operation 1007, the terminal may transmit or receive a data channel based on scheduling information of the acquired DCI.

Embodiment 2-1

Embodiment 2-1 proposes an additional method for determining a time point at which a terminal blind-decodes a PDCCH. The terminal may blind-decode a PDCCH, received in a particular slot (e.g., a k-th slot), in another slot (e.g., an n-th slot). In this example, as a method for determining a time point of blind-decoding of the received PDCCH, time-domain resource allocation information and a PDCCH monitoring occasion may be simultaneously considered.

When the PDCCH received in the k-th slot corresponds to a PDCCH through which scheduling DCI for a PDSCH can be transmitted, the terminal may blind-decode the corresponding PDCCH in the n-th (n=k) slot, and the value of n may be determined using the following method. If a total of M PDCCH monitoring occasions between the k-th slot and a (k+k')-th slot (here, k' corresponds to Equation 1, 2, or 3 of the second embodiment) exist in a $(k+n_1)$-th slot, a $(k+n_2)$-th slot, . . . , and a $(k+n_M)$-th slot, n may be identical to $k+n_M$. In other words, n may correspond to a slot, which is nearest to the (k+k')-th slot and in which a PDCCH monitoring occasion exists, that is, the $(k+n_M)$-th slot.

If a PDCCH monitoring occasion does not exist between the k-th slot and the (k+k')-th slot (here, k' corresponds to Equation 1, 2, or 3 of the second embodiment), n may be identical to k+k'.

Embodiment 2-2

According to the second embodiment, a terminal, which is to operate in a sleep mode in a particular slot (e.g., slot n), may additionally determine whether the terminal should perform a pre-configured or indicated operation (e.g., transmission/reception of another channel or signal) in slot n. If the terminal should perform a pre-configured or indicated operation in slot n, the terminal does not operate in a sleep mode, but may perform the relevant operation. If there is no pre-configured or indicated operation that the terminal should perform in slot n, the terminal may operate in the sleep mode. The above-described pre-configured or indicated operation may correspond to at least one of, for example, the following operations of a terminal.

Operation of receiving a PDSCH scheduled in slot n (according to a PDCCH transmitted in a slot other than slot n);

Operation of transmitting a PUSCH scheduled in slot n (according to a PDCCH transmitted in a slot other than slot n);

Reception of a PDSCH configured as semi-persistent scheduling (SPS) so as to be performed in slot n;

PUSCH transmission configured as a configured grant (CG) so as to be performed in slot n;

Transmission of reception acknowledgement information (HARQ-ACK) for a PDSCH;

Reception and measurement of an SS/PBCH block or a CSI-RS;

Reporting of channel state measurement and transmission of a measurement report;

Transmission of a scheduling request of the terminal; and

Transmission of a periodic, semi-persistent, or aperiodic SRS of the terminal.

Figure 11:
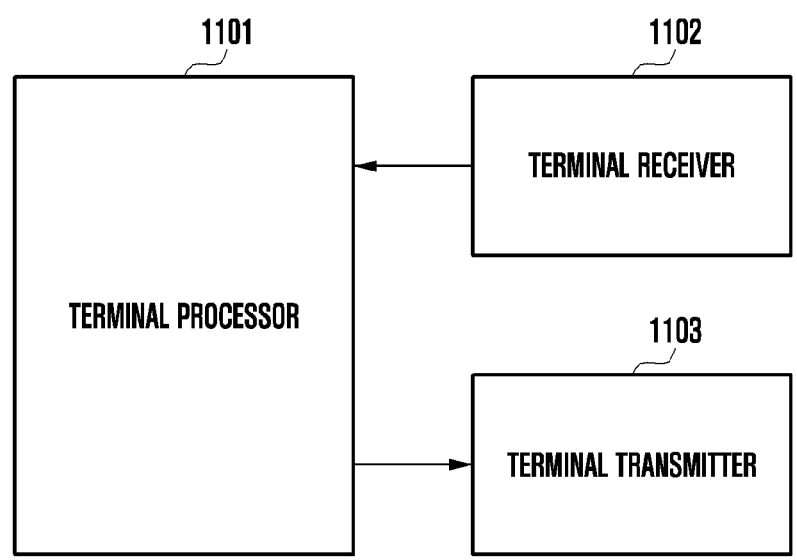
FIG. 11 illustrates a block diagram of an internal configuration of a terminal according to embodiments.
Figure 12:
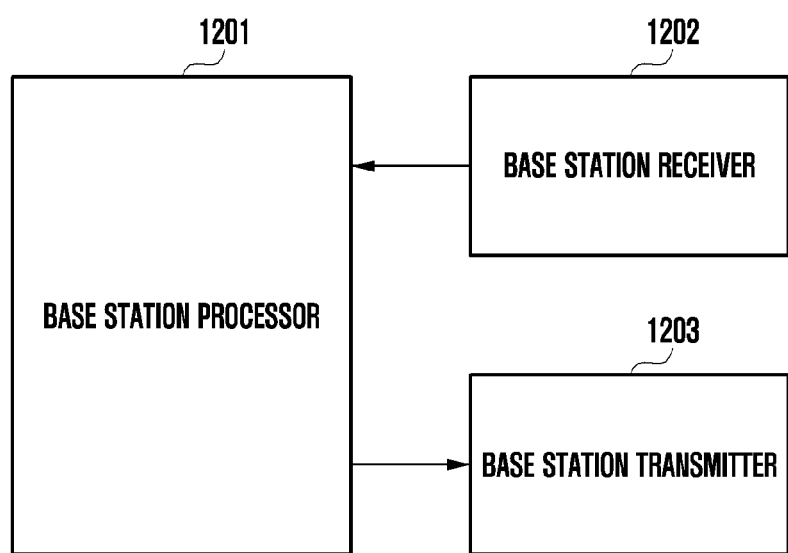
FIG. 12 illustrates a block diagram of an internal configuration of a base station according to embodiments.

FIG. 11 illustrates a terminal including a transmitter, a receiver, and a controller which are configured to perform the above-described embodiments. FIG. 12 illustrates a base station including a transmitter, a receiver, and a controller which are configured to perform the above-described embodiments. A transmission/reception method performed by each of the base station and the terminal is implemented to apply a method for blind-decoding a PDCCH and a method for controlling a sleep mode to the 5G communication system corresponding to the above-described embodiments. According to the embodiments, each of the transmitter, the receiver, and the processor of the terminal, and each of the transmitter, the receiver, and the processor of the base station perform the transmission/reception methods.

Specifically, FIG. 11 illustrates a block diagram of an internal configuration of a terminal according to embodiments. Referring to FIG. 11, the terminal according to the disclosure may include a terminal processor 1101 a terminal receiver 1102, and a terminal transmitter 1103.

The terminal processor 1101 may be configured to control a series of processes so that the terminal can operate according to the above-described embodiments. For example, the terminal processor 1101 may be configured to differently control a PDCCH blind-decoding operation, a sleep mode operation, and the like of the terminal according to embodiments. In the embodiments, the terminal receiver 1102 and the terminal transmitter 1103 may be collectively referred to as a "transceiver". The transceiver may be configured to transmit or receive a signal to or from a base station. The signal may include control information and data. To this end, the transceiver may include an RF transmitter configured to up-convert and amplify a frequency of the transmitted signal, an RF receiver configured to low-noise-amplify the received signal and down-convert the frequency, and the like. Also, the transceiver may be configured to receive a signal through a radio channel and output the received signal to the terminal processor 1101, and may be configured to transmit a signal output from the terminal processor 1101 through a radio channel.

FIG. 12 illustrates a block diagram of an internal configuration of a base station according to embodiments. Referring to FIG. 12, the base station according to the disclosure may include a base station processor 1201, a base station receiver 1202, and a base station transmitter 1203.

The base station processor 1201 may be configured to control a series of processes so that the base station can operate according to the above-described embodiments. For example, the base station processor 1201 may be configured to differently control configuration of a time domain resource allocation table, a PDCCH transmission method, and the like according to embodiments. In embodiments, the base station receiver 1202 and the base station transmitter 1203 may be collectively referred to as a "transceiver". The transceiver may be configured to transmit or receive a signal to or from the terminal. The signal may include control information and data. To this end, the transceiver may include an RF transmitter configured to up-convert and amplify a frequency of the transmitted signal, an RF receiver configured to low-noise-amplify the received signal and down-convert the frequency, and the like. Also, the transceiver may be configured to receive a signal through a radio channel and output the received signal to the base station processor 1201, and may be configured to transmit a signal output from the base station processor 1201 through a radio channel.

The embodiments shown and described in this specification and the accompanying drawings have been provided to easily describe the technical contents of the disclosure and help the understanding of the disclosure, and are not intended to limit the scope of the disclosure. That is, it will be apparent to those skilled in the art to which the disclosure pertains that different modifications based on the technical idea of the disclosure can be practiced. Further, the embodiments may be combined as needed for implementation.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a terminal of a wireless communication system, the method comprising:
   identifying k' corresponding to a minimum value among at least one slot offset value in a time-domain resource allocation table configured for the terminal;
   receiving, from a base station, a physical downlink control channel (PDCCH) signal for scheduling data transmission in a k-th slot;
   performing blind-decoding of the received PDCCH signal in a (k+k')-th slot;
   identifying whether downlink control information (DCI) for the terminal has been acquired as a result of the blind-decoding; and
   in a case that the DCI for the terminal has not been acquired, determining to operate in a sleep mode in a remaining period of the (k+k')-th slot.

2. The method of claim 1, further comprising:
   receiving another PDCCH signal in the (k+k')-th slot, simultaneously with the blind-decoding.

3. The method of claim 1, further comprising:
   in case that the DCI for the terminal has been obtained, identifying a slot offset value indicated by the DCI.

4. The method of claim 3, further comprising:
   in case that the slot offset value indicated by the DCI is equal to the k', performing data transmission and reception based on the DCI; and
   in case that the slot offset value indicated by the DCI is greater than the k', operating in the sleep mode operation is performed in the remaining time period of the (k+k')-th slot.

5. The method of claim 4, further comprising:
   in case that the terminal is to operate in the sleep mode, identifying whether a pre-configured or indicated operation of the terminal which is to be performed in the (k+k')-th slot exists; and
   in case that the pre-configured or indicated operation exists,
   performing the pre-configured or indicated operation without operating in the sleep mode operation in the (k+k')-th slot, or
   in case that the pre-configured or indicated operation does not exist,
   operating in the sleep mode operation in the (k+k')-th slot.

6. The method of claim 1, further comprising:
in case that the terminal is to operate in the sleep mode,
identifying whether a pre-configured or indicated operation of the terminal which is to be performed in the (k+k')-th slot exists; and
in case that the pre-configured or indicated operation exists,
performing the pre-configured or indicated operation without operating in the sleep mode in the (k+k')-th slot, or
in case that the pre-configured or indicated operation does not exist,
operating in the sleep mode in the (k+k')-th slot.

7. The method of claim 6, wherein the pre-configured or indicated operation comprises at least one of:
data transmission and reception scheduled in a slot other than the k-th slot;
data transmission and reception according to a configured grant (CG) configured based on higher-layer signalling; or
transmission of reception acknowledgement information for received downlink data.

8. The method of claim 6, wherein the pre-configured or indicated operation comprises at least one of:
measurement of a downlink signal; or
reporting of the measurement.

9. The method of claim 1, further comprising:
receiving, from the base station, configuration information for the time-domain resource allocation table via higher-layer signalling.

10. A terminal in a communication system, the terminal comprising:
a transceiver; and
a controller configured to:
identify k' corresponding to a minimum value among at least one slot offset value in a time-domain resource allocation table configured for the terminal,
receive, from a base station, via the transceiver, a physical downlink control channel (PDCCH) signal for scheduling data transmission in a k-th slot,
perform blind decoding of the received PDCCH signal in a (k+k')-th slot,
identify whether downlink control information (DCI) for the terminal has been acquired as a result of the blind-decoding; and
in case that the DCI for the terminal has not been acquired, determine to operate in a sleep mode in a remaining time period of the (k+k')-th slot.

11. The terminal of claim 10, wherein the controller is further configured:
to receive another PDCCH signal in the (k+k')-th slot, simultaneously with the blind-decoding.

12. The terminal of claim 10, wherein the controller is further configured to, in case that the DCI for the terminal has been obtained, identify a slot offset value indicated by the DCI.

13. The terminal of claim 12, wherein the controller is further configured to:
in case that the slot offset value indicated by the DCI is equal to the k',
perform data transmission and reception based on the DCI, and
in case that the slot offset value indicated by the DCI is greater than the k',
operate in the sleep mode in the remaining time period of the (k+k')-th slot.

14. The terminal of claim 13, wherein the controller further is configured to:
in case that the terminal is to operate in the sleep mode,
identify whether a pre-configured or indicated operation of the terminal which is to be performed in the (k+k')-th slot exists; and
in case that the pre-configured or indicated operation exists,
perform the pre-configured or indicated operation without operating in the sleep mode in the (k+k')-th slot, or
in case that the pre-configured or indicated operation does not exist,
operate in the sleep mode in the (k+k')-th slot.

15. The terminal of claim 10, wherein the controller further is configured to:
in case that the terminal is to operate in the sleep mode,
identify whether a pre-configured or indicated operation of the terminal which is to be performed in the (k+k')-th slot exists, and
in case that the pre-configured or indicated operation exists,
perform the pre-configured or indicated operation without operating in the sleep mode in the (k+k')-th slot, or
in case that the pre-configured or indicated operation does not exist,
operate in the sleep mode in the (k+k')-th slot.

16. The terminal of claim 15, wherein the pre-configured or indicated operation comprises at least one of:
data transmission and reception scheduled in a slot other than the k-th slot;
data transmission and reception according to a configured grant (CG) configured based on higher-layer signalling; or
transmission of reception acknowledgement information for received downlink data.

17. The terminal of claim 15, wherein the pre-configured or indicated operation comprises at least one of:
measurement of a downlink signal; or
reporting of the measurement.

18. The terminal of claim 10, wherein the controller is further configured to:
receive, from the base station, configuration information for the time-domain resource allocation table via higher-layer signalling.

* * * * *